United States Patent
Shin et al.

(10) Patent No.: US 9,231,795 B2
(45) Date of Patent: Jan. 5, 2016

(54) COMMUNICATION APPARATUS AND PRECODING METHOD BASED ON MULTIPLE CELLS AND MULTIPLE USERS

(75) Inventors: Won Jae Shin, Yongin-si (KR); Nam Yoon Lee, Seoul (KR); Young Jun Hong, Seoul (KR); Chang Yong Shin, Seoul (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 707 days.

(21) Appl. No.: 12/917,869

(22) Filed: Nov. 2, 2010

(65) Prior Publication Data

US 2011/0177834 A1 Jul. 21, 2011

(30) Foreign Application Priority Data

Jan. 18, 2010 (KR) .................. 10-2010-0004416
Jun. 17, 2010 (KR) .................. 10-2010-0057554

(51) Int. Cl.
*H04B 1/00* (2006.01)
*H04L 25/03* (2006.01)
*H04J 11/00* (2006.01)

(52) U.S. Cl.
CPC ....... *H04L 25/03343* (2013.01); *H04J 11/0033* (2013.01); *H04J 11/0059* (2013.01)

(58) Field of Classification Search
CPC .................................................. H04J 11/0033
USPC ............... 455/63.1, 67.13, 501, 509; 375/267
See application file for complete search history.

(56) References Cited

U.S. PATENT DOCUMENTS

| 5,953,661 A | 9/1999 | Schwinghammer et al. |
| 6,771,706 B2 | 8/2004 | Ling et al. |
| 6,785,341 B2 | 8/2004 | Walton et al. |
| 2001/0053695 A1 | 12/2001 | Wallentin |
| 2008/0225960 A1 * | 9/2008 | Kotecha et al. ............... 375/259 |
| 2009/0181708 A1 | 7/2009 | Kim et al. |
| 2009/0215480 A1 | 8/2009 | Kim et al. |
| 2009/0262719 A1 | 10/2009 | Shim et al. |
| 2009/0296650 A1 | 12/2009 | Venturino et al. |

FOREIGN PATENT DOCUMENTS

| KR | 10-2005-0110268 | 11/2005 |
| KR | 10-2006-0056212 | 5/2006 |
| KR | 10-2007-0029357 | 3/2007 |
| WO | WO 97/12489 | 4/1997 |

(Continued)

OTHER PUBLICATIONS

International Search Report and Written Opinion of the International Searching Authority issued on Sep. 23, 2011, in counterpart International Application No. PCT/KR2010/009542 (7 pages, in English).

(Continued)

*Primary Examiner* — Hsin-Chun Liao
(74) *Attorney, Agent, or Firm* — NSIP Law

(57) ABSTRACT

Provided are a communication apparatus that may generate a precoding matrix including precoding vectors to cancel or align interference existing in a plurality of terminal devices based on location of the terminal devices, and a terminal device that may estimate a channel formed between the terminal device and the communication apparatus to cancel or align interference signals.

17 Claims, 14 Drawing Sheets

(56) References Cited

FOREIGN PATENT DOCUMENTS

| WO | WO 2007/108080 A1 | 9/2007 |
|---|---|---|
| WO | WO 2009/017447 A2 | 2/2009 |
| WO | WO 2009/113100 A2 | 9/2009 |

OTHER PUBLICATIONS

Samsung "Inter-Cell Interference Mitigation Through Limited Coordination", 3GPP Draft; R1-082886 Inter-cell Interference Mitigation Through Limited Coordination, 3$^{rd}$ Generation Partnership Project, Mobile Competence Centre, Aug. 12, 2008 (9 pages, in English).

Gomadam, K. et al. "Approaching the capacity of wireless networks through distributed interference alignment." Global Telecommunications Conference, 2008. IEEE GLOBECOM 2008. IEEE. IEEE, 2008 (6 pages, in English).

Tresch, R. et al. "Cellular interference alignment with imperfect channel knowledge." Communications Workshops, 2009. ICC Workshops 2009. IEEE International Conference on. IEEE, 2009 (5 pages, in English).

Hou, X. et al. "Adaptive multi-Tx multi-Rx MIMO transmission scheme for LTE-advanced downlink." Global Telecommunications Conference, 2009. GLOBECOM 2009. IEEE. IEEE, 2009 (7 pages, in English).

Extended European Search Report issued Jul. 2, 2013 in counterpart European Application No. 10843292.3 (3 pages, in English).

Extended European Search Report issued Jul. 31, 2013 in counterpart European Application No. 12182437.9 (4 pages, in English).

Li, Bin, et al., "A New Precoding Schemem Using Interference Alignment on Modulation Signal for Multi-User MIMO Downlink." 2009 International Conference on Wireless Communications & Signal Processing. IEEE. (2009): 1-5.

Japanese Office Action mailed Jul. 8, 2014 in counterpart Japanese Application No. 2012-548876 (8 pages, in Japanese, with complete English translation).

* cited by examiner

COMMUNICATION APPARATUS AND PRECODING METHOD BASED ON MULTIPLE CELLS AND MULTIPLE USERS

CROSS-REFERENCE TO RELATED APPLICATION(S)

This application claims the benefit under 35 U.S.C. §119(a) of Korean Patent Application No. 10-2010-0004416, filed on Jan. 18, 2010, in the Korean Intellectual Property Office, and Korean Patent Application No. 10-2010-0057554, filed on Jun. 17, 2010, in the Korean Intellectual Property Office, the entire disclosure of which is incorporated herein by reference for all purposes.

BACKGROUND

1. Field

The following description relates to technology that may control interference that occurs in a terminal device and that is caused by signals transmitted from a plurality of base stations in a communication system.

2. Description of Related Art

Generally, a terminal device that is present in a communication system may receive interference signals from neighboring base stations that are adjacent to the coverage area of a serving base station.

For example, a terminal device located at a cell edge may receive interference from base stations of an adjacent cell rather than terminal devices located within a corresponding cell. The interference signal may cause a decrease in a data rate of a transmission signal.

Research is currently being conducted on a scheme of enhancing system capacity in a multi-user interference channel environment in which a plurality of base stations may interfere with each other and simultaneously transmit data to a plurality of terminal devices.

In an actual environment, inter-cell interference caused by neighboring base stations and intra-cell interference caused by neighboring terminal devices that are present in the coverage area of a serving base station may occur.

Accordingly, there is a desire for interference control technology that may enhance the use of limited radio resources based on inter-cell interference and intra-cell interference.

SUMMARY

In one general aspect, there is provided a precoding method, comprising aligning, in the same space, interference channels of one or more terminal devices included in a cell edge region of an interference base station, and generating a reception beamforming vector of one or more terminal devices included in a cell edge region of a serving base station, based on the interference channels of the interference base station that are aligned in the same space.

The precoding method may further comprise generating a precoding vector of the one or more terminal devices included in the cell edge region of the serving base station, based on a basis vector of each of the interference channels of the interference base station that are aligned in the same space, and an interference channel of the serving base station.

The precoding method may further comprise transmitting, to the one or more terminal devices included in the cell edge region of the serving base station, at least one of the reception beamforming vector and data that is precoded using the generated precoding vector.

The aligning may comprise aligning, in the same space, the interference channels of the one or more terminal devices included in the cell edge region of the interference base station to be partially overlapped with each other.

In another aspect, there is provided a communication apparatus, comprising an interference channel alignment unit to align, in the same space, interference channels of one or more terminal devices included in a cell edge region of an interference base station, and a reception beamforming vector generator to generate a reception beamforming vector of one or more terminal devices included in a cell edge region of a serving base station, based on the interference channels of the interference base station that are aligned in the same space.

The communication apparatus may further comprise a precoder to generate a precoding vector of the one or more terminal devices included in the cell edge region of the serving base station, based on a basis vector of each of the interference channels of the interference base station that are aligned in the same space, and an interference channel of the serving base station.

The precoder may transmit, to the one or more terminal devices included in the cell edge region of the serving base station, at least one of the reception beamforming vector and data that are precoded using the generated precoding vector.

The interference channel alignment unit may align, in the same space, the interference channels of the one or more terminal devices included in the cell edge region of the interference base station to be partially overlapped with each other.

In another aspect, there is provided a method of generating a reception beamforming, comprising obtaining interference channels of one or more terminal devices included in a cell edge region of an interference base station, aligning the obtained interference channels in the same space, and generating a reception beamforming vector of one or more terminal devices included in a cell edge region of a serving base station, based on the interference channels of the interference base station that are aligned in the same space.

The method may further comprise feeding back, to the serving base station, at least one of the aligned interference channels and a serving channel.

The aligning may comprise aligning, in the same space, the interference channels of the one or more terminal devices included in the cell edge region of the interference base station to be partially overlapped with each other.

In another aspect, there is provided a terminal device, comprising an interference channel obtainment unit to obtain interference channels of one or more terminal devices included in a cell edge region of an interference base station, an interference channel alignment unit to align the obtained interference channels in the same space, and a reception beamforming vector generator to generate a reception beamforming vector of one or more terminal devices included in a cell edge region of a serving base station, based on the interference channels of the interference base station that are aligned in the same space.

The terminal device may further comprise a feedback unit to feed back, to the serving base station, at least one of the aligned interference channels and a serving channel.

The interference channel alignment unit may align, in the same space, the interference channels of the one or more terminal devices included in the cell edge region of the interference base station to be partially overlapped with each other.

In another aspect, there is provided a precoding method, comprising calculating a zero-forcing precoding vector to process interference occurring between a plurality of terminal devices served by a serving base station, calculating an interference alignment precoding vector to align interference caused by a plurality of neighboring base stations located adjacent to the serving base station and interference occurring between the plurality of terminal devices served by the serving base station, generating a precoding matrix based on the zero-forcing precoding vector and the interference alignment precoding vector, and precoding data based on the generated precoding matrix.

The precoding method may further comprise determining whether each of the plurality of terminal devices is located in a cell interior region or a cell edge region, wherein a terminal device located in the cell edge region and a terminal device located in the cell interior region use the same frequency band.

The calculating of the zero-forcing precoding vector may comprise calculating the zero-forcing precoding vector when at least one terminal device from among the plurality of terminal devices is located in the cell interior region, and at least two signals may be transmitted to the at least one terminal device located in the cell interior region.

The calculating of the interference alignment precoding vector may comprise calculating the interference alignment precoding vector when at least one terminal device from among the plurality of terminal devices is located in the cell edge region.

The determining may comprise determining whether each of the plurality of terminal devices is located in the cell interior region or the cell edge region based on location information of the plurality of terminal devices or a signal-to-interference plus noise ratio (SINR) of each of the plurality of terminal devices.

The precoding method may further comprise selecting at least one terminal device from a plurality of terminal devices located in the cell edge region of each of the serving base station and the plurality of neighboring base stations, and selecting at least one terminal device from a plurality of terminal devices located in cell interior regions of each of the serving base station and the plurality of neighboring base stations, wherein the generating comprises generating the precoding matrix based on at least two zero-forcing precoding vectors that are calculated with respect to the selected at least one terminal device located in the cell interior region.

When the selected at least one terminal device is located in the cell edge region of each of the serving base station and the plurality of neighboring base stations, the method may further comprise selecting, from a plurality of terminal devices located in the cell interior region of the serving base station, at least one terminal device either to increase a sum of throughputs of selected terminal devices located in the cell edge region or to increase a throughput of a terminal device having a minimum throughput from among the selected terminal devices located in the cell edge region.

The precoding method may further comprise selecting, from a plurality of terminal devices located in the cell interior region of the serving base station, at least one terminal device to increase throughputs of terminal devices located in the cell edge region of each of the serving base station and the plurality of neighboring base stations, wherein the generating comprises generating the precoding matrix based on at least two zero-forcing precoding vectors that are calculated with respect to the selected at least one terminal device.

When selected at least one terminal device is located in the cell edge region of each of the serving base station and the plurality of neighboring base stations, the method may further comprise selecting, from a plurality of terminal devices located in the cell interior region of the serving base station, a plurality of terminal devices enabling throughputs of selected terminal devices located in the cell edge region to be greater than or equal to a predetermined reference value, and selecting a terminal device having a greater throughput from the selected plurality of terminal devices located in the cell interior region.

The precoding method may further comprise selecting, from a plurality of terminal devices located in the cell interior region of the serving base station, a terminal device to increase a sum of throughputs of the terminal devices, wherein the generating comprises generating the precoding matrix based on at least two zero-forcing precoding vectors that are calculated with respect to the selected terminal device.

In another aspect, there is provided a communication apparatus, comprising a calculator to calculate a zero-forcing precoding vector to process interference occurring between a plurality of terminal devices served by a serving base station, and to calculate an interference alignment precoding vector to align interference caused by a plurality of neighboring base stations located adjacent to the serving base station and interference occurring between the plurality of terminal devices served by the serving base stations, a generator to generate a precoding matrix based on the zero-forcing precoding vector and the interference alignment precoding vector, and a precoder to precode data based on the generated precoding matrix.

The communication apparatus may further comprise a decision unit to determine whether each of the plurality of terminal devices is located in a cell interior region or a cell edge region, wherein a terminal device located in the cell edge region and a terminal device located in the cell interior region use the same frequency band.

The decision unit may determine whether each of the plurality of terminal devices is located in the cell interior region or the cell edge region based on location information of each of the plurality of terminal devices or an SINR of each of the plurality of terminal devices.

The calculator may calculate the zero-forcing precoding vector when at least one terminal device from among the plurality of terminal devices is located in the cell interior region, and at least two signals may be transmitted to the at least one terminal device located in the cell interior region.

The calculator may calculate the interference alignment precoding vector when at least one terminal device from among the plurality of terminal devices is located in the cell edge region.

The communication apparatus may further comprise a selector to select, from a plurality of terminal devices located in the cell interior region of the serving base station, at least one terminal device either to increase a sum of throughputs of selected terminal devices located in the cell edge region or to increase a throughput of a terminal device having a minimum throughput from among the selected terminal devices located in the cell edge region, when at least one terminal device is selected from a plurality of terminal devices located in the cell edge region of each of the serving base station and the plurality of neighboring base stations, wherein the generator generates the precoding matrix based on at least two zero-forcing precoding vectors that are calculated with respect to the selected at least one terminal device.

In another aspect, there is provided a terminal device, comprising a decoding matrix generator to extract channel information from precoded data received from a serving base station, and to generate a decoding matrix based on the extracted channel information, and a decoder to decode the precoded data based on the generated decoding matrix, wherein a precoding matrix included in the channel matrix includes a zero-forcing precoding vector and an interference alignment precoding vector.

The decoding matrix generator may generate the decoding matrix including a zero-forcing decoding vector and an interference alignment decoding vector based on the channel information, or generate the decoding matrix using a minimum mean square error (MMSE) estimation scheme.

The zero-forcing decoding vector may be used to reduce interference between the terminal device and a plurality of neighboring terminal devices of the serving base station, and the interference alignment decoding vector may be used to align a desired signal received from the serving base station in a first space and interference signals caused by the plurality of neighboring terminal devices of the serving base station and a plurality of neighboring base stations in a different space.

The zero-forcing decoding vector and the interference alignment decoding vector may be orthogonal to the interference signals.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1:
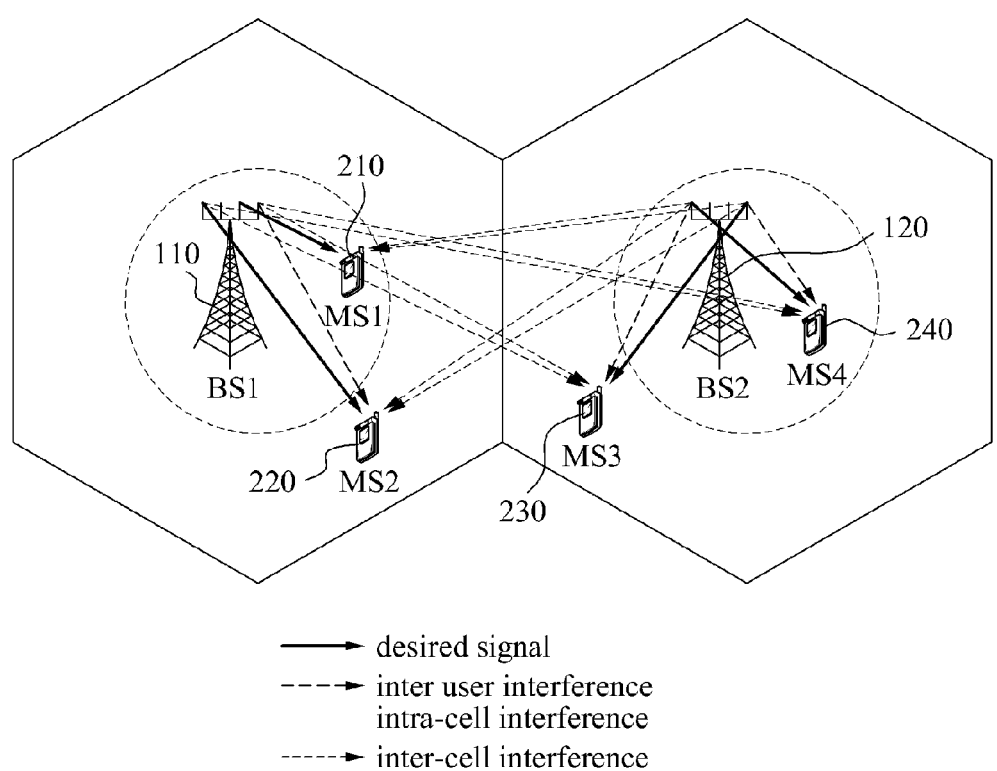
FIG. 1 is a diagram illustrating an example of a communication system including a plurality of cells and a plurality of terminal devices.

FIG. 1 illustrates an example of a communication system that includes a plurality of cells and a plurality of terminal devices. The plurality of cells may include, for example, a communication apparatus such as a cellular base station, a femto base station, a fixed base station, a mobile base station, a relay, a terminal device, a combination thereof, and the like.

Inter-cell interference may be caused by a signal transmitted from a neighboring base station and the like located in an adjacent cell. That is, terminal devices located in a cell edge region may receive inter-cell interference that is caused by a signal transmitted from a neighboring base station, and the like, that are located in the adjacent cell.

Referring to the communication system of FIG. 1, when a serving base station of a first terminal device (MS1) 210 and a second terminal device (MS2) 220 corresponds to a first base station (BS1) 110, the MS2 220 that is located at a cell edge region of the first base station 110 may receive interference that is caused by a signal transmitted from a second base station (BS2) 120. In this example, the second base station 120 corresponds to a neighboring base station that serves a third terminal device (MS3) 320 and a fourth terminal device (MS4) 240.

Similarly, the MS3 230 located at a cell edge region of the second base station 120 may receive interference that is caused by a signal transmitted from the BS1 110 to the MS1 210 and MS2 220.

For example, interference may occur in terminal devices located at a cell edge region caused by a signal transmitted from a serving base station to terminal devices being served by the serving base station. Accordingly, because of the signal transmitted from the serving base station to other terminal devices within a corresponding cell, the terminal devices located at the cell edge region may receive intra-cell interference. The intra-cell interference is also referred to as inter use interference.

For example, the MS2 220 may receive interference that is caused by a signal transmitted from the BS1 110 to the MS1 210. Similarly, the MS3 230 may receive interference that is caused by a signal transmitted from the BS2 220 to the MS4 240.

Figure 4:
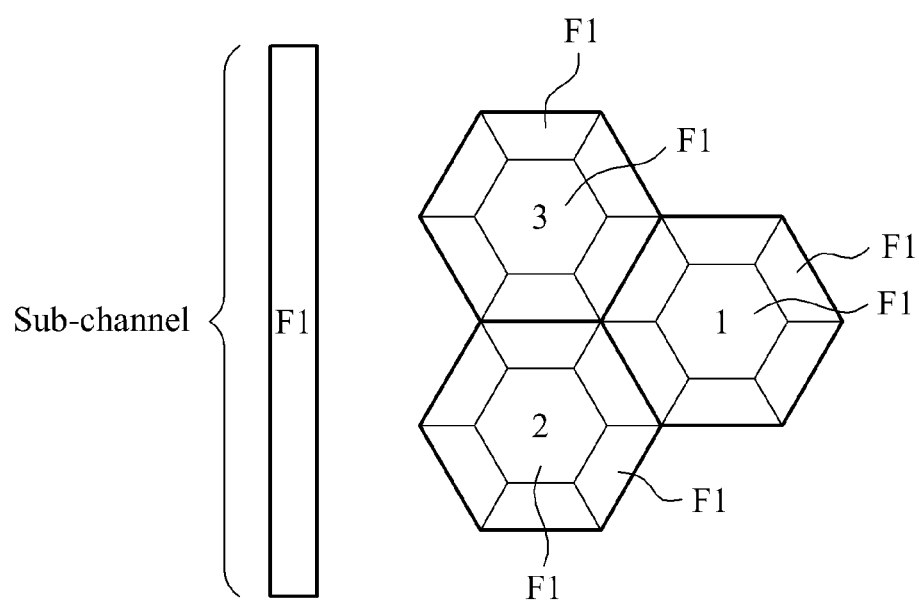
FIG. 4 is a diagram illustrating an example of terminal devices that use the same frequency band.

When terminal devices located within a cell and terminal devices located at a cell edge region use the same frequency band as shown in FIG. 4, the terminal devices located within the cell may also receive interference that is caused by a signal transmitted from a serving base station to other terminal devices. The terminal devices located within the cell may receive intra-cell interference due to the other terminal devices belonging to the serving base station.

For example, the MS1 210 may receive interference that is caused by a signal transmitted from the BS1 110 to the MS2 220. The MS4 240 may receive interference due to a signal transmitted from the BS2 120 to the MS3 230.

Accordingly, when a plurality of terminal devices are served by a single base station in a multi-cell system, inter-cell interference and intra-cell interference may be controlled.

Described herein is a technology for controlling interference based on a location of each terminal device when a plurality of base stations and a plurality of terminal devices are present in multiple cells and use the same frequency.

Figure 3:
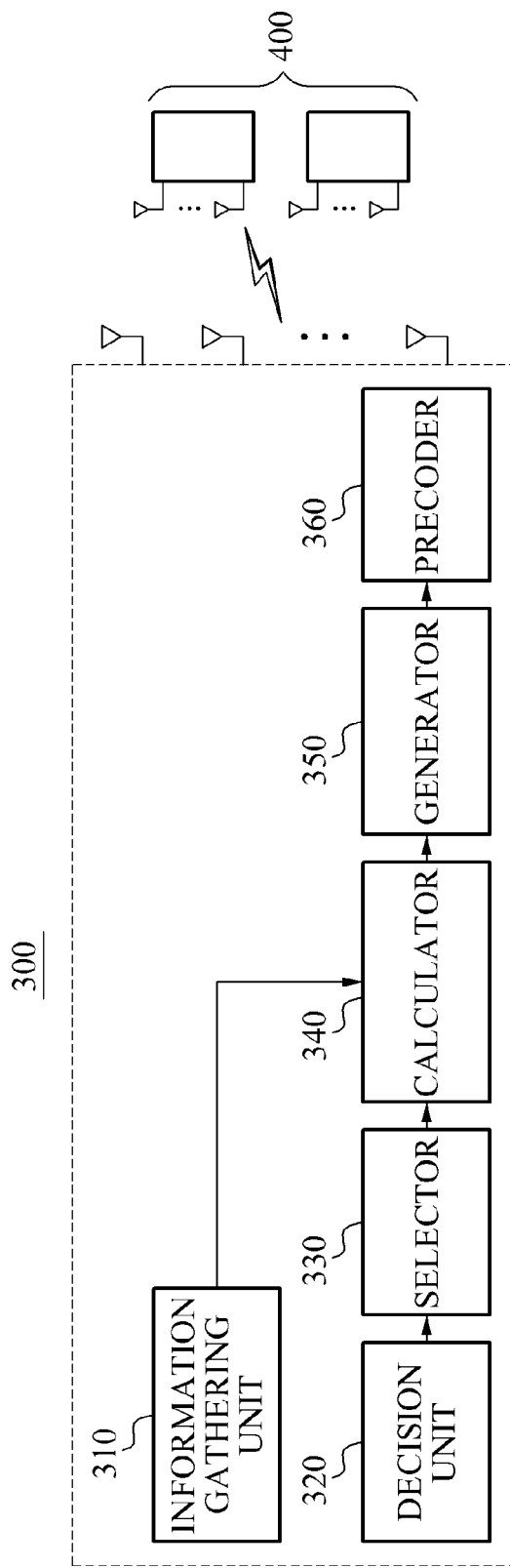
FIG. 3 is a diagram illustrating an example of a communication apparatus.

FIG. 3 illustrates an example of a communication apparatus.

For ease of description, it is assumed in FIG. 3 that the BS1 110 of FIG. 1 corresponds to a serving base station and the BS2 120 corresponds to a neighboring base station. FIG. 3 is described herein in association with FIG. 1.

Referring to FIG. 3, communication apparatus 300 includes an information gathering unit 310, a decision unit 320, a selector 330, a calculator 340, a generator 350, and a precoder 360.

The information gathering unit 310 may receive channel information from a plurality of terminal devices that are served by the serving base station.

For example, referring to FIG. 1, the information gathering unit 310 may receive channel information from the MS1 210 and the MS2 220 that are served by the BS1 110.

The information gathering unit 310 may receive, from a plurality of neighboring base stations, channel information associated with a plurality of terminal devices that are served by the plurality of neighboring base stations, respectively.

For example, referring to FIG. 1, the information gathering unit 310 may receive, from the BS2 120, channel information associated with the MS3 230 and the MS4 240 that are served by the BS2 120.

The decision unit 320 may determine whether each of the terminal devices that are served by the serving base station is located in a cell interior region or a cell edge region. In this example, terminal devices located in the cell interior region and terminal devices located in the cell edge region may use the same frequency band, for example, as shown in FIG. 4.

The decision unit 320 may determine whether the terminal devices are located in the cell interior region or the cell edge region based on location information associated with the plurality of terminal devices and/or based on an amount of interference of each of the terminal devices.

Using the location information the decision unit 320 may calculate a distance between the serving base station and each of the terminal devices.

For example, when the calculated distance is less than a predetermined reference distance, the decision unit 320 may determine a corresponding terminal device is a terminal device that is located in the cell interior region. When the calculated distance is greater than or equal to the reference distance, the decision unit 320 may determine the corresponding terminal device is a terminal device that is located in the cell edge region. The location information may be received from the terminal device or a satellite, and the serving base station may calculate a location of the terminal device, for example, using triangulation, and the like.

The decision unit 320 may measure a strength of the signal received from the plurality of terminal devices. For a terminal device of which the measured signal strength is greater than or equal to a predetermined reference strength, the decision unit 320 may determine that the terminal device is located in the cell interior region.

For a terminal device of which the measured signal strength is less than the reference strength, the decision unit 320 may determine that the terminal device is located in the cell edge region.

For example, referring to FIG. 1, when a signal strength of the MS1 210 is greater than or equal to the reference strength and a signal strength of the MS2 220 is less than the reference strength, the decision unit 320 of the BS1 110 may determine the MS1 210 is located in the cell interior region and that the MS2 220 is located in the cell edge region.

Using the amount of interference and a ratio of interference caused by a plurality of neighboring base stations, the decision unit 320 may determine whether each of the terminal devices are located in the cell edge region or the cell interior region. For example, the decision unit 320 may determine the location of the terminal device based on a signal-to-interference plus noise ratio (SINR), a reference signal received power (RSRP), a reference signal received quality (RSRQ), and the like, of each of the terminal devices.

To generate a precoding matrix the selector 330 may select at least one terminal device from the terminal devices located in the cell edge region and at least one terminal device from the terminal devices located in the cell interior region, using scheduling.

The selector 330 may select the terminal devices that are located in the cell edge region and select the terminal devices that are located in the cell interior region. The selected terminal devices located in the cell interior region may affect a throughput of the pre-selected terminal devices located in the cell edge region. Accordingly, criteria from various points of views may be used to select the terminal devices located in the cell interior region.

For example, referring to FIG. 1, when the MS2 220 and the MS3 230 are selected as the terminal devices located in the cell edge region, the selector 330 may select, from the terminal devices located in the cell interior region, a terminal device to increase a sum of throughputs of the selected MS2 220 and the MS3 230, as shown by Equation 1 below.

In this example, at least one terminal device located in the cell interior region may be selected. The throughput may include a transmission capacity and a proportional fairness metric.

$$\operatorname*{argmax}_{1,4}(C_2 + C_3).$$ [Equation 1]

In Equation 1, $C_2$ corresponds to a throughput of the MS2 220 and $C_3$ corresponds to a throughput of the MS3 230.

When the MS2 220 and the MS3 230 are selected from the plurality of terminal devices located in the cell edge region, the selector 330 may select terminal devices located in the cell interior region to increase a throughput of a terminal device that has the least throughput from among the throughputs of the selected MS2 220 and the MS3 230, as shown by the following Equation 2.

$$\operatorname*{argmaxmin}_{1,4}(C_2, C_3).$$ [Equation 2]

When the MS2 220 and the MS3 230 are selected from the plurality of terminal devices located in the cell edge region, the selector 330 may select terminal devices located in the cell interior region to enable throughputs of the selected MS2 220 and the MS3 230 to be greater than or equal to a predetermined reference value δ as given by Equation 3 below. In this example, the selector 330 may select, from the selected terminal devices, any terminal device having a maximum throughput.

$$\sum_{i=1}^{4} C_i, C_2, C_3 \geq \delta.$$ [Equation 3]

In Equation 3, 'i' corresponds to an index of a corresponding terminal device and δ corresponds to the predetermined reference value.

As described above, a single serving base station may select at least one terminal device from the terminal devices included in a cell of the serving base station and at least one terminal device from terminal devices located in a cell interior region present in a different cell. However, this is only an example and it should be understood that a serving base station of each cell may select terminal devices located in a respective corresponding cell interior region.

The selector 330 may select, from the terminal devices located in the cell interior region, a terminal device that increases the throughputs of all the terminal devices located in the cell edge region.

For example, the selector 330 may select a terminal device located in the cell interior region using Equation 4 below.

$$\arg_1 \max(C_2), \arg_4 \max(C_3).$$ [Equation 4]

According to Equation 4, and referring to FIG. 1, the selector 330 may select the MS1 210 as a terminal device to increase the throughput of the MS2 220. The selector 330 may also select the MS4 240 as the terminal device to increase the throughput of the MS3 230.

The selector 330 may select terminal devices located in the cell interior region to increase a sum of throughputs of terminal devices included in a communication system.

For example, the selector 330 may select a terminal device to increase a sum of throughputs of terminal devices located in the cell interior region and the cell edge region. In this example, the selected terminal device is located in the cell interior region.

$$\sum_{i=1}^{4} C_i.$$ [Equation 5]

The calculator 340 may calculate a zero forcing (ZF) precoding vector and an interference alignment (IA) precoding vector based on channel information of the selected terminal device or the selected terminal devices.

The ZF precoding vector may be used to control interference that occurs between a plurality of terminal devices that are served by a serving base station. For example, the ZF precoding vector may be used to reduce intra-cell interference that occurs in a terminal device located in the cell interior region.

The IA precoding vector may be used to control interference that is caused by a plurality of neighboring base stations and interference that occurs between terminal devices that are served by the serving base station.

For example, the IA precoding vector may be used to align intra-cell interference and inter-cell interference in a signal space that is different from a desired signal.

For example, assuming that the communication apparatus 300 includes four antennas, and each of terminal devices 400 includes two antennas, the MS1 210 and the MS4 240 may be selected as terminal devices located in the cell interior region, and the MS2 220 and the MS3 230 may be selected as terminal devices located in the cell edge region.

Figure 2:
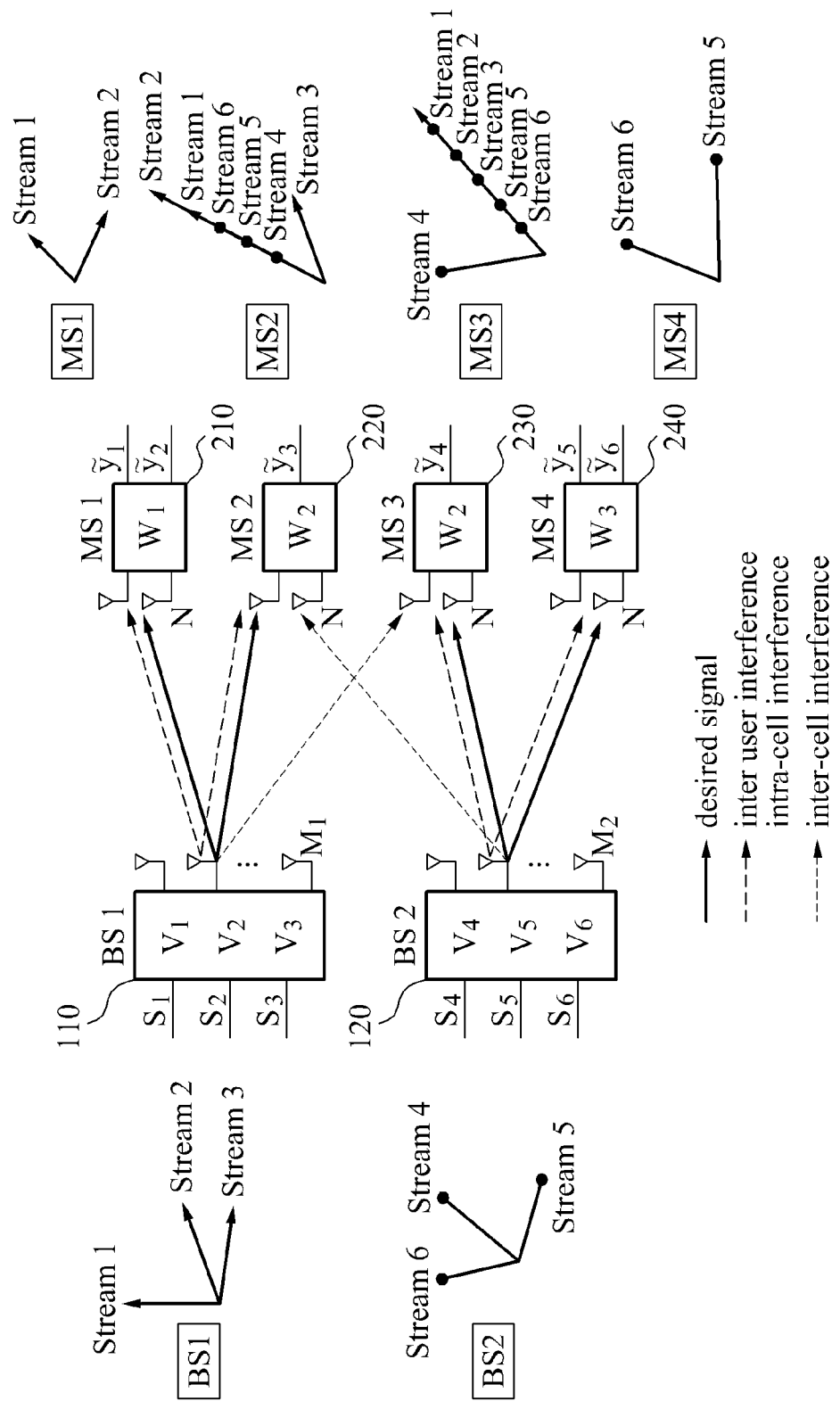
FIGS. 2 and 6 are diagrams illustrating examples of a process for controlling interference that occurs in a terminal device based on a location of the terminal device.

FIG. 2 illustrates an example of a process for controlling interference that occurs in a terminal device based on a location of the terminal device Referring to FIG. 2, for example, the BS1 110 corresponding to the serving base station may transmit two signals to the MS1 210 that is located in the cell interior region, and may transmit a single signal to the MS2 220 that is located in the cell edge region. A signal transmitted from the serving base station to terminal devices may be expressed by the following Equation 6.

$$x_i = \sqrt{p_i} v_i s_i.$$ [Equation 6]

In Equation 6, $s_i$ corresponds to a symbol transmitted from the serving base station to a terminal device, $v_i$ corresponds to a precoding vector, and $p_i$ corresponds to transmission power of the symbol to be transmitted. The precoding vector $v_i$ may have a unit norm condition $\|v_i\|^2 = 1$.

A signal $y_j$ received from each of terminal devices may be given by Equation 7 below. In Equation 7, 'j' corresponds to the number of terminal devices.

$$y_1 = \sum_{i=1}^{3} \sqrt{p_i} H_{1,1} v_i s_i + n_1$$ [Equation 7]

$$y_2 = \sum_{i=1}^{3} \sqrt{p_i} H_{2,1} v_i s_i + \sum_{j=4}^{6} \sqrt{p_j} H_{2,2} v_j s_j + n_2$$

$$y_3 = \sum_{i=1}^{3} \sqrt{p_i} H_{3,1} v_i s_i + \sum_{j=4}^{6} \sqrt{p_j} H_{3,2} v_j s_j + n_3$$

$$y_4 = \sum_{i=4}^{6} \sqrt{p_i} H_{4,2} v_i s_i + n_4.$$

In Equation 7, $H_{j,i}$ corresponds to channel information transmitted from an $i^{th}$, base station to a $j^{th}$ terminal device, and $n_j$ corresponds to additive white Gaussian noise (AWGN) in the $j^{th}$ terminal device.

The calculator 340 may calculate the ZF precoding vector to reduce the interference that occurs in a terminal device that is located in the cell interior region selected using ZF.

For example, when the MS1 210 and the MS4 240 correspond to the terminal devices that are located in the cell interior region, the calculator 340 may generate the ZF precoding vector to reduce interference that occurs in the MS1 210 and MS4 240, as given by the following Equation 8.

$$H_{1,1}v_3=0, H_{4,2}v_4=0.$$ [Equation 8]

When the MS2 220 and the MS3 230 correspond to the terminal devices that are located in the cell edge region, the calculator 340 may generate the IA precoding vector to align interference that occurs in the MS2 220 and the MS3 230, as given by the following Equation 9.

$$\mathrm{span}(u_1) = \mathrm{span}[H_{2,1}v_1, H_{2,1}v_2, H_{2,2}v_4, H_{2,2}v_5, H_{2,2}v_6]$$

$$\mathrm{span}(u_2) = \mathrm{span}[H_{3,1}v_1, H_{3,1}v_2, H_{3,1}v_3, H_{3,2}v_5, H_{3,2}v_6].$$ [Equation 9]

In Equation 9, $u_1$ corresponds to a signal space of the MS2 220 where interference signals are aligned, and $u_2$ corresponds to a signal space of the MS3 230 where interference signals are aligned.

For example, when the MS2 220 includes two antennas, the calculator 340 may calculate the IA precoding vector to align, in different signal spaces, five different types of interference signals based on channel information as shown in FIG. 2. For example, streams 1, 2, 4, 5, and 6, may be aligned in a first signal space and a desired signal such as stream 3 may be aligned in a different signal space,.

As another example, when the MS3 230 includes two antennas, the calculator 340 may calculate the IA precoding vector to align, in different signal spaces, different types of five interference signals, for example, streams 1, 2, 3, 5, and 6, in a first signal space and a desired signal such as stream 4 in a different signal space.

The generator 350 may generate a precoding matrix based on ZF precoding vectors and IA precoding vectors. The generator 350 may generate a precoding matrix to reduce and align interference existing in terminal devices, using the following Equation 10.

$$\begin{bmatrix} 0 & 0 & 0 & 0 & H_{1,1} & 0 & 0 & 0 \\ 0 & 0 & 0 & 0 & 0 & H_{4,2} & 0 & 0 \\ \alpha_1 I_N & 0 & -H_{2,1} & 0 & 0 & 0 & 0 & 0 \\ \alpha_2 I_N & 0 & 0 & -H_{2,1} & 0 & 0 & 0 & 0 \\ \alpha_3 I_N & 0 & 0 & 0 & -H_{2,2} & 0 & 0 & 0 \\ \alpha_4 I_N & 0 & 0 & 0 & 0 & -H_{2,2} & 0 & 0 \\ \alpha_5 I_N & 0 & 0 & 0 & 0 & 0 & -H_{2,2} & 0 \\ 0 & \alpha_6 I_N & -H_{3,1} & 0 & 0 & 0 & 0 & 0 \\ 0 & \alpha_7 I_N & 0 & -H_{3,1} & 0 & 0 & 0 & 0 \\ 0 & \alpha_8 I_N & 0 & 0 & -H_{3,1} & 0 & 0 & 0 \\ 0 & \alpha_9 I_N & 0 & 0 & 0 & -H_{3,2} & 0 & 0 \\ 0 & \alpha_{10} I_N & 0 & 0 & 0 & 0 & -H_{3,2} \end{bmatrix} \begin{bmatrix} u_1 \\ u_2 \\ v_1 \\ v_2 \\ v_3 \\ v_4 \\ v_5 \\ v_6 \end{bmatrix} = \begin{bmatrix} 0 \\ 0 \\ 0 \\ 0 \\ 0 \\ 0 \\ 0 \\ 0 \\ 0 \\ 0 \\ 0 \\ 0 \end{bmatrix} \Leftrightarrow \begin{bmatrix} f_1(v_3) \\ f_2(v_4) \\ f_3(\alpha_1, u_1, v_1) \\ f_4(\alpha_2, u_1, v_2) \\ \vdots \\ f_{12}(\alpha_{10}, u_2, v_6) \end{bmatrix} = 0 \quad \text{[Equation 10]}$$

In Equation 10, $\alpha_i$ corresponds to a constant.

For example, a norm of all precoding vectors and decoding vectors included in the generated precoding matrix may be "1".

For example, when two signals are transmitted to the terminal device located in the cell interior region and a signal is transmitted to the terminal device located in the cell edge region, the generator 350 may generate the precoding matrix including precoding vectors that satisfy Equation 11 below.

A norm of all precoding vectors $v_i$, (i=1, 2, ..., 6) and decoding vectors $u_j$, (i=1, 2) may be "1", as given by the following Equation 11.

$$g_k(v_k) = \|v_k\|^2 - 1 = 0, \, k=1,2, \ldots 6$$

$$h_l(u_l) = \|u_l\|^2 - 1 = 0, \, l=1,2. \quad \text{[Equation 11]}$$

In Equation 11, $v_k$, (k=1, 2, ..., 6) corresponds to the precoding vector and $u_l$, (l=1, 2) corresponds to the decoding vector.

The precoding vectors included in the precoding matrix may be independent from each other.

For example, referring to FIG. 2, the calculator 340 may calculate the ZF precoding vector and the IA precoding vector such that precoding vectors $v_1$, $v_2$, and $v_3$, corresponding to the BS1 110 are independent from each other each other as given by Equation 12 below. The calculator 340 may also calculate the ZF precoding vector and the IA precoding vector such that precoding vectors $v_4$, $v_5$, and $v_6$, corresponding to the BS2 120 are independent from each other each other.

To be independent from each other, the precoding vectors may satisfy the following Equation 12.

$$T = [t_1 \; t_2 \; t_3] = pinv(V) \cdot V = \begin{bmatrix} 1 & 0 & 0 \\ 0 & 1 & 0 \\ 0 & 0 & 1 \end{bmatrix} = I_3, \quad \text{[Equation 12]}$$

$$V = [v_1 \; v_2 \; v_3].$$

In Equation 12, pinv corresponds to a Moore-Penrose pseudoinverse matrix and 'I' corresponds to a unit identify matrix.

Equation 12 may be expressed by the following Equation 13.

$$i_1(v_1, v_2, v_3) = (t_1)^H \begin{bmatrix} 1 \\ 0 \\ 0 \end{bmatrix} - 1 = 0, \quad \text{[Equation 13]}$$

$$i_2(v_1, v_2, v_3) = (t_2)^H \begin{bmatrix} 0 \\ 1 \\ 0 \end{bmatrix} - 1 = 0,$$

$$i_3(v_1, v_2, v_3) = (t_3)^H \begin{bmatrix} 0 \\ 0 \\ 1 \end{bmatrix} - 1 = 0.$$

The generator 350 may generate the precoding matrix based on the ZF precoding vectors and the IA precoding vectors.

For example, the calculator 340 may calculate precoding vectors that satisfy Equation 11 and Equation 12 according to Equation 14 below. The generator 350 may generate the precoding matrix including the calculated precoding vectors.

For example, conditions $f_1$ through $f_{12}$ to reduce and align interference existing in a terminal device, conditions $i_1$ through $i_3$ for precoding vectors to be independent from each other, and norm conditions $g_1$ through $g_6$ of precoding vectors and decoding vectors, may be expressed by the following Equation 14.

$$l_2(z) = \begin{bmatrix} f_1(v_3) \\ f_2(v_4) \\ f_3(\alpha_1, u_1, v_1) \\ f_4(\alpha_2, u_1, v_2) \\ \vdots \\ f_{12}(\alpha_{10}0, u_2, v_6) \\ g_1(v_1) \\ \vdots \\ g_6(v_6) \\ h_1(u_1) \\ h_2(u_2) \\ i_1(v_1, v_2, v_3) \\ \vdots \\ i_3(v_1, v_2, v_3) \end{bmatrix} = 0,$$  [Equation 14]

$z = [\alpha_1, \ldots, \alpha_{12}, u_1^T, u_2^T, v_1^T, \ldots v_6^T]$.

Solutions for Equation 14 may become precoding vectors constituting the precoding matrix. For example, the generator 350 may generate the precoding matrix including the solutions calculated using Equation 14. The solutions according to Equation 14 may be obtained using Newton's method. The obtained solutions may include $u_1$, $u_2$, $v_1$, $v_2$, $v_3$, $v_5$, and $v_6$.

The precoder 360 may precode data based on the generated precoding matrix. The precoded data may be transmitted to the terminal devices 400 via antennas.

When the number of antennas included in a base station is M=4, and the number of antennas included in a terminal device is N=2, 42 ((2+2×5+2)×N+3×2+2+6)) number of equations may exist and a total of 42 (2×N+6×M+5×2+4) number of unknown quantities may exist according to Equation 14. Accordingly, Equation 14 may have at least one solution based on Bezout's theory.

Figure 5:
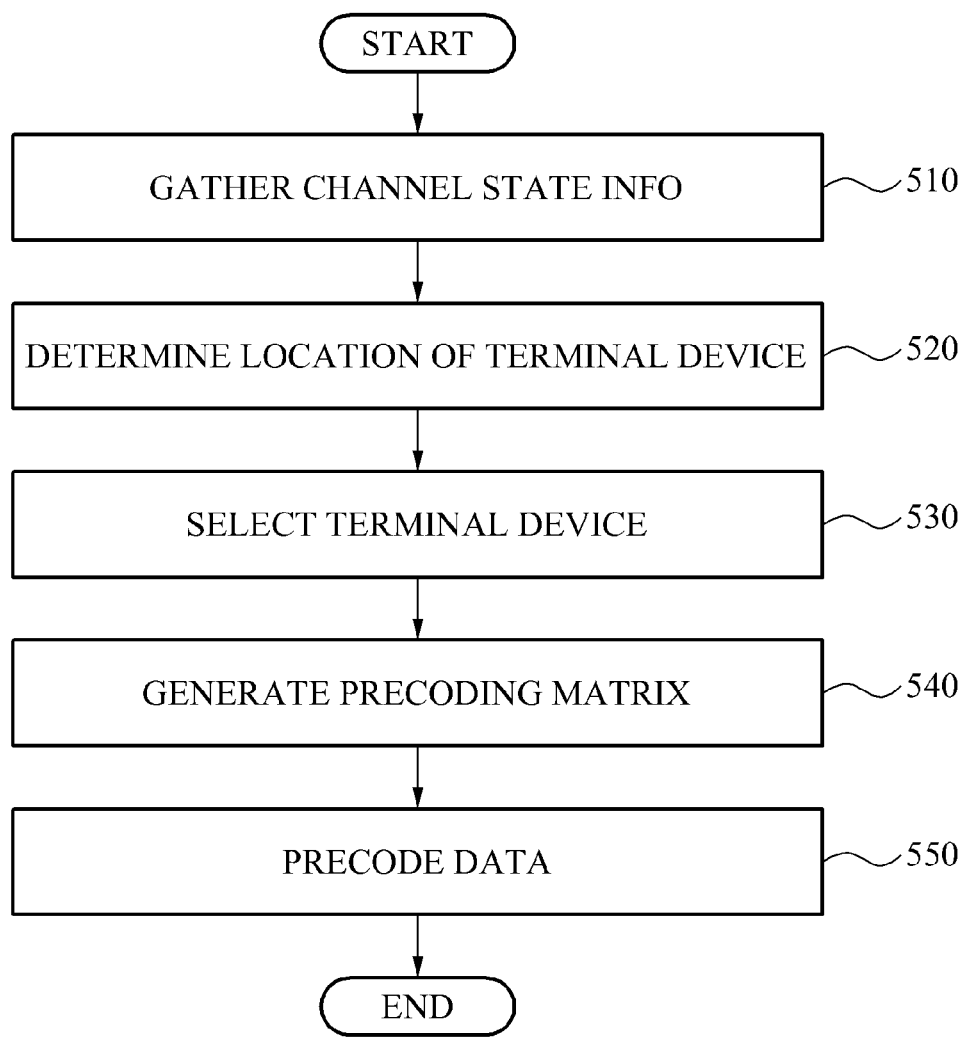
FIG. 5 is a flowchart illustrating an example of a method for controlling interference in a communication apparatus.
Figure 6:
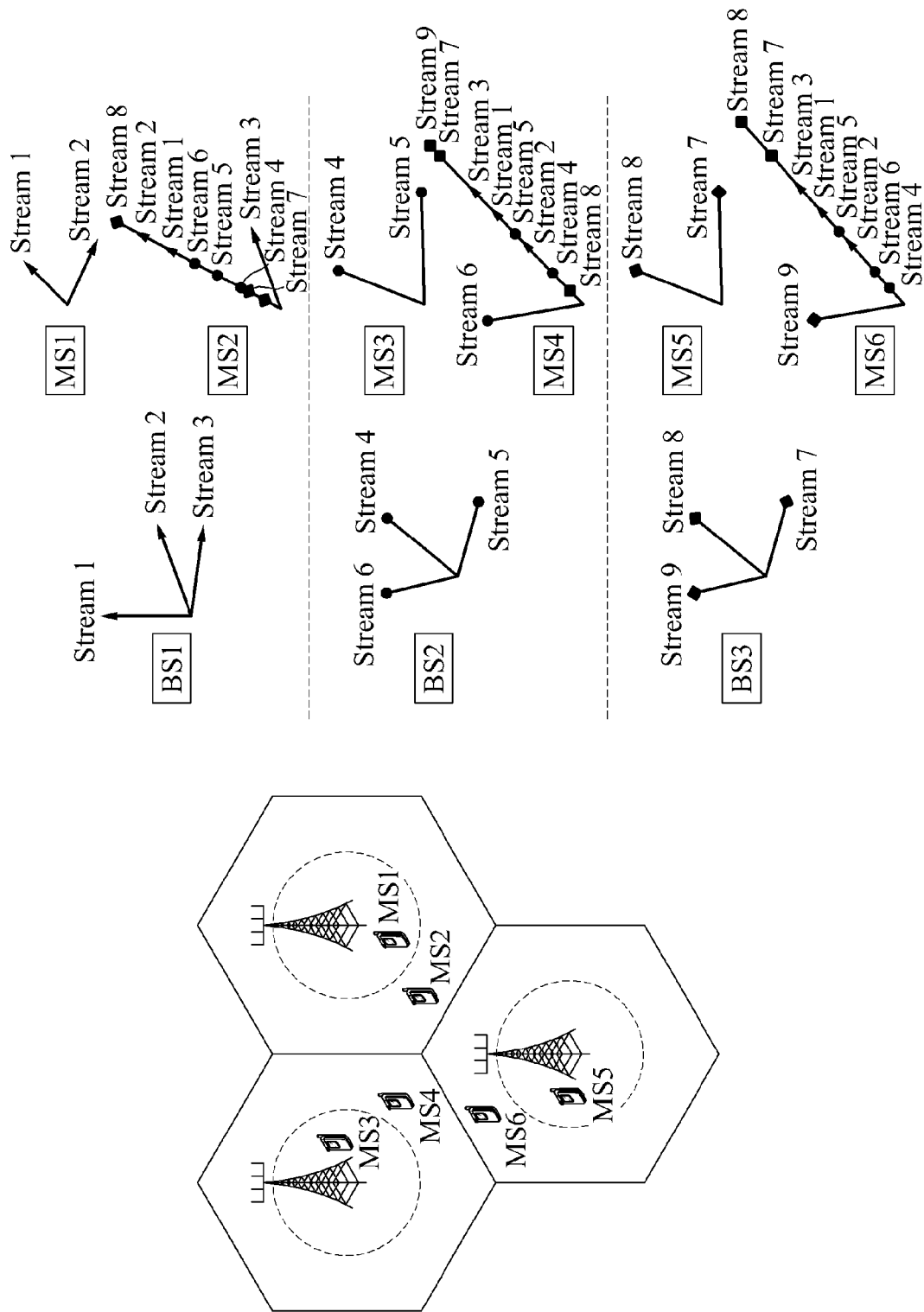

FIG. 5 illustrates an example of a method for controlling interference in a communication apparatus. The communication apparatus may be, for example, the communication apparatus 300 of FIG. 3.

In 510, the information gathering unit 310 may receive channel information from a plurality of terminal devices that are served by a serving base station and from a plurality of terminal devices that are served by neighboring base stations.

Each of the neighboring base stations may transmit channel information to the serving base station. The channel information may be associated with a plurality of terminal devices that are served by a corresponding neighboring base station. For example, the channel state information associated with a plurality of terminal devices included in a communication system may be fed back to the serving base station.

In 520, the decision unit 320 may determine a location of each of the terminal devices based on a respective signal strength received from each of the plurality of terminal devices.

For example, the decision unit 320 may determine whether each of the terminal devices is located in a cell interior region or a cell edge region based on the location information of each of the terminal devices or based on an interference amount of each of the terminal devices. The signal strength of a corresponding terminal device may be used as the location information. An SINR, an RSRP, and/or an RSRQ may be used as the interference amount.

As shown in FIG. 4, terminal devices located in the cell interior region and terminal devices located in cell edge region may use the same frequency band.

In 530, the selector 330 may select at least one terminal device used to generate a precoding vector. For example, the selected at least one terminal device may be located in the cell interior region.

For example, when at least one terminal device is selected from a plurality of terminal devices located in a cell edge region of each of the serving base station and a plurality of neighboring base stations, the selector 330 may select a terminal device that increases a sum of throughputs of the selected terminal devices located in the cell edge region. In this example, the selector 330 may select at least one terminal device located in the cell interior region.

The selector 330 may select terminal devices located in the cell interior region to increase a throughput of a terminal device that has the least throughput from among the selected terminal devices located in the cell edge region as shown Equation 2.

The selector 330 may select a terminal device that has a maximum throughput from the terminal devices located in the cell interior region using a reference value as shown in Equation 3.

The selector 330 may select a terminal device located in the cell interior region to increase a throughput of only a selected terminal device located in the cell edge region.

In some embodiments, the selector 330 may select a terminal device to increase a sum of throughputs of all the terminal devices being served by the serving base station and a plurality of neighboring base stations, as shown in Equation 5.

The calculator 340 may calculate a ZF precoding vector and an IA precoding vector with respect to the selected terminal devices located in the cell edge region and the selected terminal devices located in the cell interior region. In 540, the generator 350 may generate a precoding matrix based on ZF precoding vectors and IA precoding vectors.

The ZF precoding vectors may be used to reduce interference that occurs in the terminal devices located in the cell interior region. For example, the interference that occurs in the terminal devices located in the cell interior region may include intra-cell interference.

The IA precoding vectors may be used to align interference signals that occur in the terminal devices located in the cell edge region in a predetermined signal space.

For example, when a serving base station includes four antennas, the serving base station may transmit two signals to terminal devices located in the cell interior region, and transmit a single signal to terminal devices located in the cell edge region. Accordingly, two ZF precoding vectors may be calculated in 540. As another example, when the serving base station includes four or more antennas, two or more ZF precoding vectors may be calculated.

In 550, the precoder 360 may precode data based on the generated precoding matrix. The precoded data may be transmitted to the plurality of terminal devices.

Figure 7:
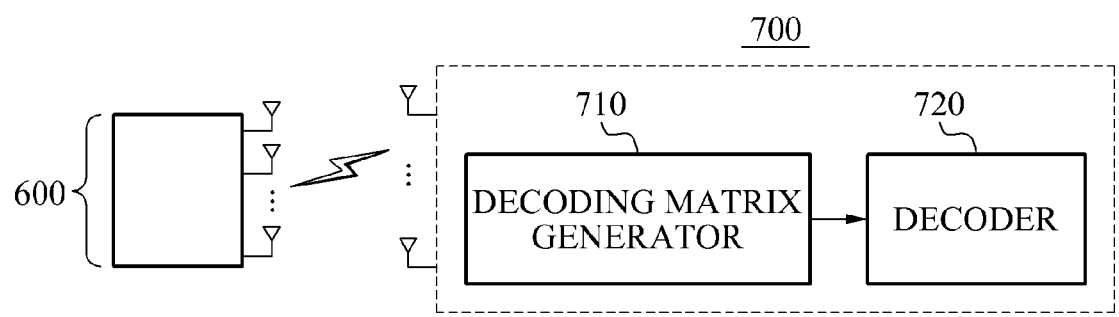
FIG. 7 is a diagram illustrating an example of a terminal device.

FIG. 7 illustrates an example of a terminal device.

Referring to FIG. 7, terminal device 700 includes a decoding matrix generator 710 and a decoder 720. The decoding matrix generator 710 may estimate a channel state of a channel that is formed between a serving base station 600 and the terminal device 700. The precoded data may be received from the serving base station 600 via an antenna.

The decoding matrix generator 710 may estimate a channel formed between the serving base station 600 and the terminal device 700, and extract channel information from the precoded data. The channel information may include a precoding matrix V generated at the serving base station 600, and a channel matrix $H_{j,i}$ between the serving base station 600 and the terminal device 700. For example, the precoding matrix V may include ZF precoding vectors and IA precoding vectors.

The decoding matrix generator 710 may generate a decoding matrix based on the channel information. The decoding matrix may include ZF decoding vectors and IA decoding vectors.

Accordingly, when the terminal device 700 is located in the cell edge region, the terminal device 700 may align received interference signals in a first space and a desired signal in a different signal space. The decoding vectors included in a decoding matrix may be orthogonal to the interference signals.

When the terminal device 700 is located in the cell interior region, the terminal device 700 may reduce interference signals that exist in received streams. The decoder 720 may decode the precoded data based on the generated decoding matrix.

The generated precoding matrix may include precoding vectors to align interference that occurs in terminal devices located in the cell edge region in order to reduce interference.

For the terminal devices located in the cell edge region, interference signals may be controlled using an IA scheme. In addition, the terminal devices located in the cell edge region may reduce interference signals using a ZF scheme.

The serving base station 600 may generate a precoding matrix that includes precoding vectors generated using ZF. For example, when the precoding matrix is generated using ZF, the number of antennas included in the serving base station 600 may increase to five or more. In this example, terminal devices located in the cell edge region and terminal devices located in the cell interior region may use the same frequency band.

As described above, the terminal device 700 may estimate a channel and align or reduce interference signals. The terminal device 700 may directly receive a decoding vector or a decoding matrix from the serving base station 600. The terminal device 700 may decode precoded data based on the received decoding vector or decoding matrix, and align or reduce interference signals. The serving base station 600 may quantize the decoding vector or the decoding matrix, and transmit the quantized decoding vector or decoding matrix to the terminal device 700.

Although FIG. 7 is described based on a single serving base station, it is merely for purposes of example. It should be understood that similar descriptions may be applicable to examples where a plurality of serving base stations are present.

As described in the example above, after the terminal devices located in the cell edge region are selected, the terminal devices located in the cell interior region may be selected. In some examples, the selector 330 may simultaneously select the terminal devices located in the cell interior region and the terminal devices located in the cell edge region.

Also, in some examples, the selector 330 may select the terminal devices located in the cell interior region, and then select the terminal devices located in the cell edge region using the terminal devices located in the cell interior region.

As described above, the decoding matrix may be generated such that decoding vectors and interference signals are orthogonal to each other. However, this is merely for purposes of example and it should be understood that the decoding matrix may be generated using various decoding schemes such as a minimum mean square error MMSE estimation scheme.

A process of generating a precoding matrix using at least one of a terminal device included in a cell edge region and a terminal device included in a cell interior region in multiple cells, and then passively receiving, by the corresponding terminal device, precoded data that may be used to generate a decoding matrix for removing interference is described above with reference to FIG. 1 through FIG. 7. Hereinafter, a process of initially generating a reception beamforming vector using terminal devices included in a cell edge region and then generating a precoding vector using the generated reception beamforming vector are described.

Figure 8:
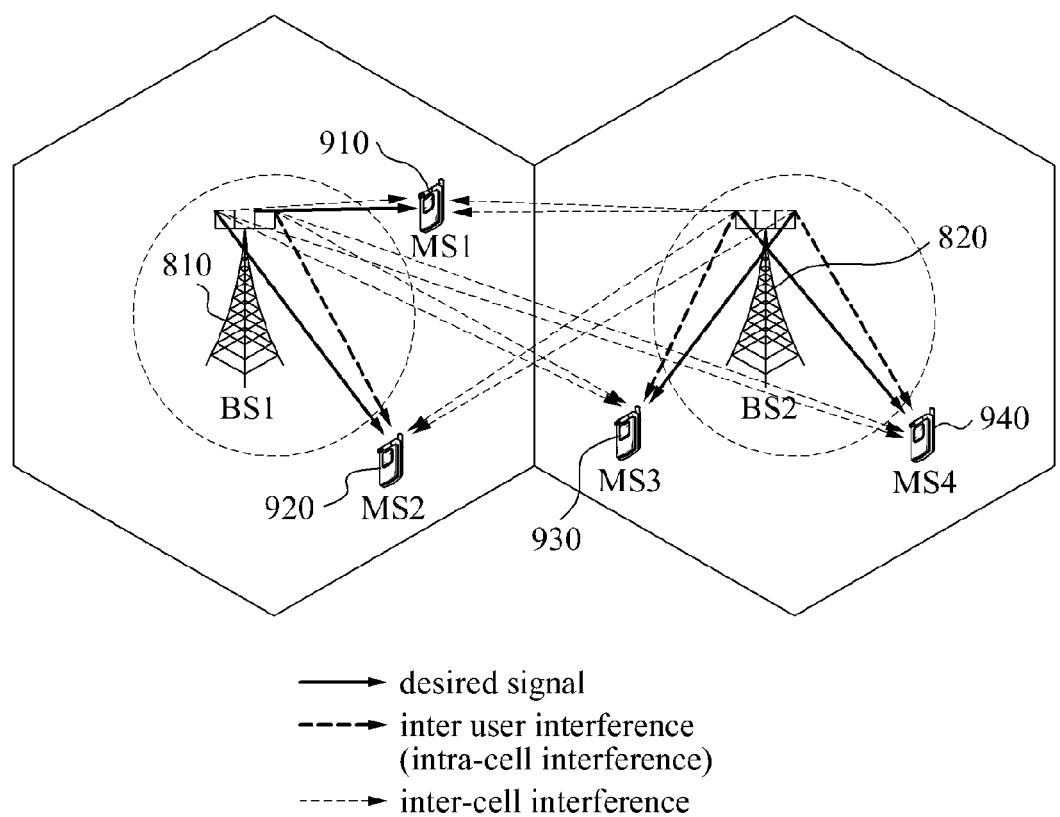
FIG. 8 and FIG. 9 are diagrams illustrating examples of a multi-cell-based communication system that includes terminal devices located in a cell edge region.
Figure 9:
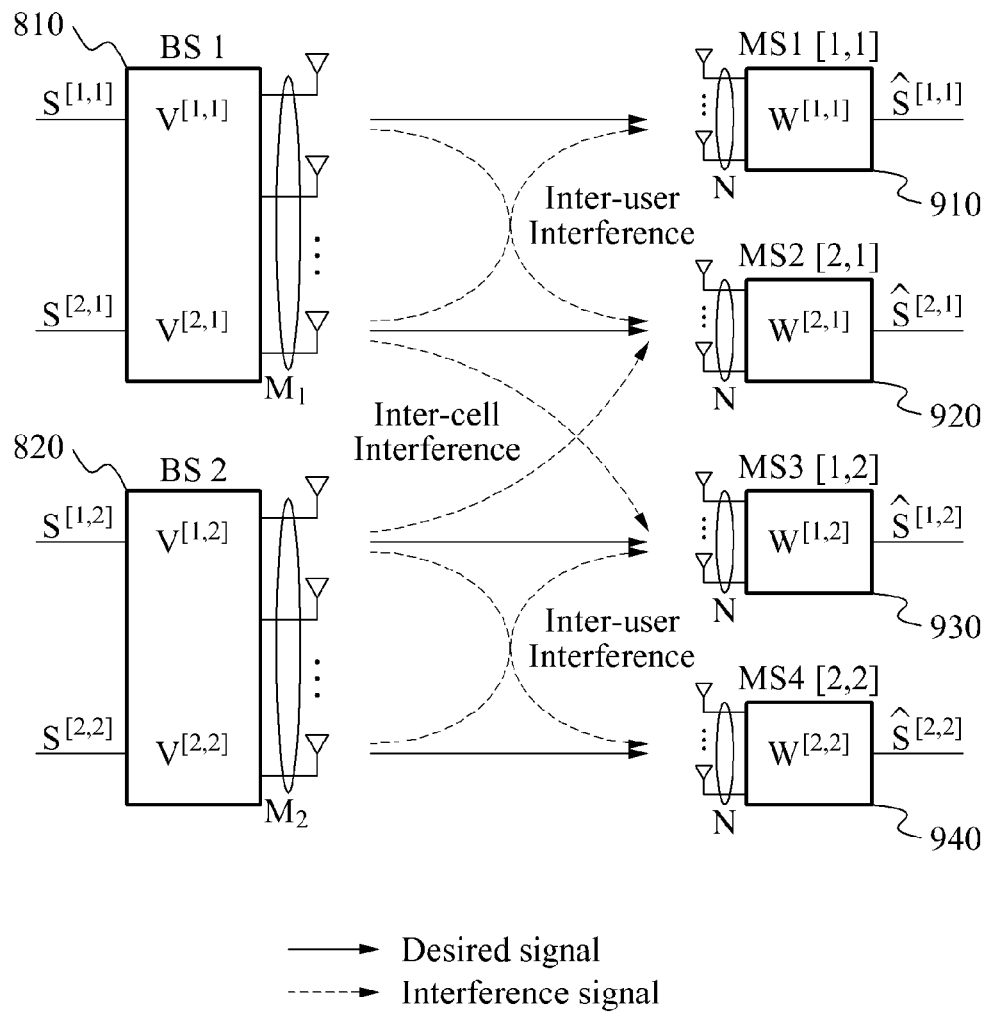

FIG. 8 and FIG. 9 illustrate examples of a multi-cell-based communication system that includes terminal devices located in a cell edge region. Even though two cells are shown in FIG. 8 for ease of description, three or more cells may exist.

Referring to FIG. 8, a plurality of cells may include a communication apparatus such as a cellular base station, a femto base station, a fixed base station, a mobile base station, a relay, a terminal, a combination thereof, and the like. The plurality of devices may be located in cell edge regions of the cells.

Terminal devices located in a cell edge region may receive inter-cell interference due to a signal transmitted from an interference base station, and the like, that are located in an adjacent cell.

For example, a first terminal device (MS1) 910 and a second terminal device (MS2) 920 included in a cell edge region of a serving base station (BS1) 810 may receive interference caused by signals transmitted from an interference base station (BS2) 820 to a third terminal device (MS3) 930 and a fourth terminal device (MS4) 940 included in a cell edge region of the BS2 820. Referring to FIG. 9, the MS1 910 and the MS2 920 may receive inter-cell interference from an interference base station included in an adjacent cell.

Mutual interference may also occur between the MS1 910 and the MS2 920 served by the BS1 810. For example, referring to FIG. 9, the MS1 910 may receive inter-user interference caused by a signal transmitted from the BS1 810 to the MS2 920. The MS2 920 may also receive inter-user interference caused by a signal transmitted from the BS1 810 to the MS1 910. In this example, the BS1 810 may decrease the inter-cell interference and the inter-user interference by initially generating a reception beamforming vector of each of the MS1 910 and the MS2 920 that are served by the BS1 810.

In FIGS. 8 and 9, an interference base station corresponds to a base station included in a cell adjacent to the cell where the serving base station is located. Referring to FIG. 9, when the BS1 810 corresponds to the serving base station, the BS2 820 corresponds to the interference base station. Likewise, when the BS2 820 corresponds to the serving base station, the BS1 810 corresponds to the interference base station.

Figure 10:
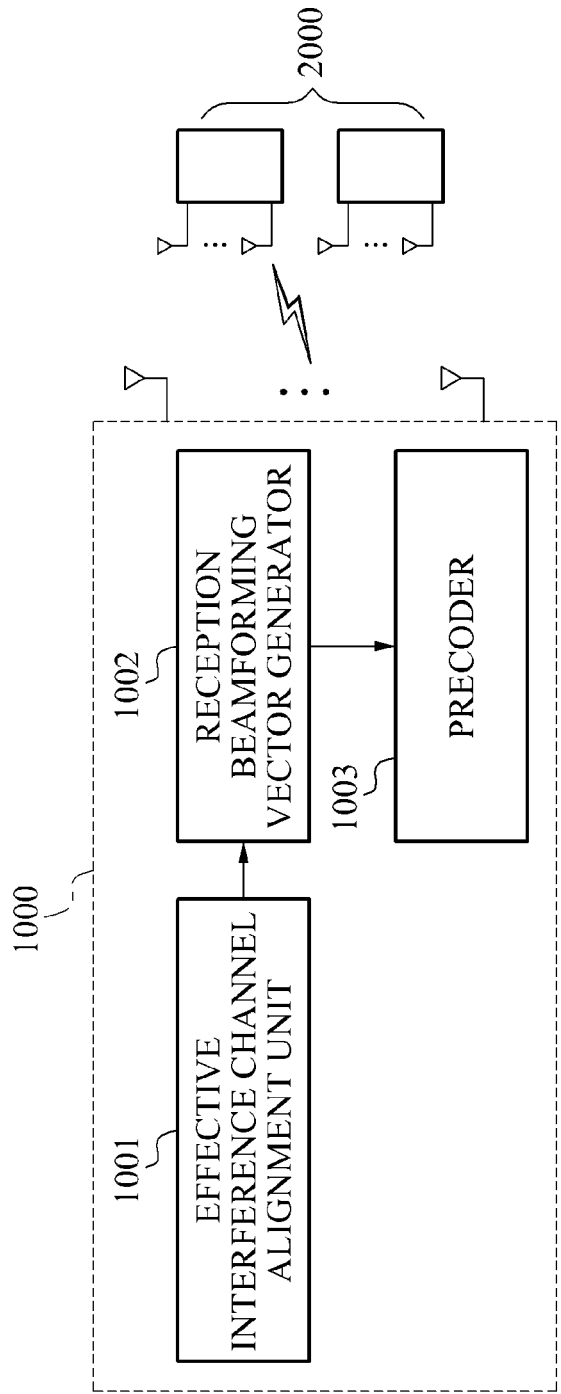
FIG. 10 is a diagram illustrating an example of a communication apparatus that generates a reception beamforming vector.

FIG. 10 illustrates an example of a communication apparatus that generates a reception beamforming vector. Hereinafter, descriptions are made based on the assumption that the BS1 810 corresponds to the serving base station and the BS2 820 corresponds to the interference base station in the communication system of FIG. 9.

Referring to FIG. 10, communication apparatus 1000 includes an interference channel alignment unit 1001, a reception beamforming vector generator 1002, and a precoder 1003. In this example, three antennas are installed in each of the serving base station and the interference base station, and two antennas are installed in a terminal device.

According to an interference alignment scheme, a precoding vector $v^{[k,i]}$ of a $k^{th}$ terminal device included in an $i^{th}$ cell may be represented by the following Equation 15.

$$v^{[k,i]} \subset \text{null}([(w^{[\bar{k},i]^H} H_i^{[\bar{k},i]})^H]^H). \qquad \text{[Equation 15]}$$

In Equation 15, null(A) corresponds to an orthonormal basis constituting a null space of A, $w^{[\bar{k},i]}$ corresponds to a reception beamforming vector of a $\bar{k}^{th}$ terminal device included in a cell edge region of the serving base station i, $H_i^{[\bar{k},i]}$ corresponds to a channel of the $\bar{k}^{th}$ terminal device included in the cell edge region of the serving base station i, $(w^{[\bar{k},i]^H} H_i^{[\bar{k},i]})^H$ corresponds to an interference channel by the $k^{th}$, terminal device included in the cell edge region of the serving base station i, $W^{[k,\bar{i}]}$ corresponds to a reception beamforming vector of the $k^{th}$ terminal device included in a cell edge region of an interference base station $\bar{i}$, $H_i^{[k,\bar{i}]}$ corresponds to a channel of the $k^{th}$ terminal device included in the cell edge region of the interference base station $\bar{i}$, and $(w^{[k,\bar{i}]^H} H_i^{[k,\bar{i}]})^H$ corresponds to an interference channel by the $k^{th}$ terminal device included in the cell edge region of the interference base station $\bar{i}$. In this example, $(w^{[\bar{k},i]^H} H_i^{[\bar{k},i]})^H$ corresponds to an interference channel by inter-user interference, and $(w^{[k,\bar{i}]^H} H_i^{[k,\bar{i}]})^H$, corresponds to an interference channel by inter-cell interference.

For example, when two terminal devices (k=1, 2) are located in a cell edge region of each of two cells (i=1, 2), Equation 15 may be represented by the following Equation 16.

$$v^{[k,i]} \subset \text{null}(\{(w^{[\bar{k},i]^H} H_i^{[\bar{k},i]})^H, (w^{[1,\bar{i}]^H} H_i^{[1,\bar{i}]})^H, (w^{[2,\bar{i}]^H} H_i^{[2,\bar{i}]})^H\}). \quad \text{[Equation 16]}$$

In Equation 16, $(w^{[1,\bar{i}]^H} H_i^{[1,\bar{i}]})^H$, corresponds to an interference channel of the MS3 930, and $(w^{[2,\bar{i}]^H} H_i^{[2,\bar{i}]})^H$, corresponds to an interference channel of the MS4 940.

Referring again to FIG. 10, the interference channel alignment unit 1001 may align interference channels of terminal devices included in the cell edge region of the interference base station in the same space.

For example, the interference channel alignment unit 1001 may align, in the same space, the interference channels $(w^{[1,\bar{i}]^H} H_i^{[1,\bar{i}]})^H$ and $(w^{[2,\bar{i}]^H} H_i^{[2,\bar{i}]})^H$ of the MS3 930 and the MS4 940 by generating a space including $(w^{[1,\bar{i}]^H} H_i^{[1,\bar{i}]})^H$ and $(w^{[2,\bar{i}]^H} H_i^{[2,\bar{i}]})^H$ according to the following Equation 17.

$$\text{span}(H_i^{[1,\bar{i}]^H} w^{[1,\bar{i}]^H}) = \text{span}(H_i^{[2,\bar{i}]^H} w^{[2,\bar{i}]^H}) \quad \text{[Equation 17]}$$

According to Equation 17, the interference channel alignment unit 1001 may align, in the same space, the interference channels of the MS3 930 and the MS4 940 by calculating a rank or value of the interference channels of the MS3 930 and the MS4 940 to have a value of 1 or a proximate value of 1, by calculating $$\text{rank}(w^{[1,\bar{i}]^H} H_i^{[1,\bar{i}]^H}, w^{[2,\bar{i}]^H} H_i^{[2,\bar{i}]^H}) \approx 1.$$

The serving base station may transmit data to the terminal devices included in the cell edge region of the serving base station using three antennas.

In this example, the interference channel alignment unit 1001 may generate the space where the interference channels of the terminal devices included in the cell edge region of the interference base station. Also, the interference channel alignment unit 1001 may also generate the space where the interference channels of the terminal devices included in the cell edge region of the interference base station. For example, the interference channels of the terminal devices served by the BS2 820 may be overlapped with each other.

The interference channel alignment unit 1001 may calculate a basis vector of interference channels of the interference base station that are aligned in the same space.

For example, the interference channel alignment unit 1001 may calculate the basis vector $h_i^{ic}$ of the interference channels of the interference base station using Equation 18 below. In this example, the basis vector $h_i^{ic}$ corresponds to an aligned interference channel to be transmitted from a serving base station i to terminal devices served by an interference base station $\bar{i}$. For example, $h_i^{ic}$ may indicate an alignment direction of the interference channels of the interference base station that are aligned in the same space.

$$h_i^{ic} = \frac{1}{\alpha_1^{[\bar{i}]}} H_i^{[1,\bar{i}]^H} w^{[1,\bar{i}]} = \frac{1}{\alpha_2^{[\bar{i}]}} H_i^{[2,\bar{i}]^H} w^{[2,\bar{i}]} \quad \text{[Equation 18]}$$

In Equation 18, $$\frac{1}{\alpha_1^{[\bar{i}]}} w^{[1,\bar{i}]}$$

corresponds to a vector obtained by scaling the reception beamforming vector of the third terminal device served by the interference base station $\bar{i}$, and $$\frac{1}{\alpha_2^{[\bar{i}]}} w^{[2,\bar{i}]}$$

corresponds to a vector obtained by scaling the reception beamforming vector of the fourth terminal device.

The reception beamforming vector generator 1002 may generate the reception beamforming vector of each of the terminal devices included in the cell edge region of the serving base station using the interference channels of the interference base station that are aligned in the same space. For example, the reception beamforming vector generator 1002 may generate the reception beamforming vector of each of the terminal devices included in the cell edge region of the serving base station by normalizing a matrix including vectors that are obtained by scaling reception beamforming vectors of the terminal devices served by the interference base station.

The reception beamforming vector generator 1002 may generate a matrix $M_i$, including an identify matrix and a channel of each of the terminal devices served by the interference base station through normalization, as shown by Equation 19, below. The reception beamforming vector generator 1002 may generate a matrix $x_i$ including the basis vector $h_i^{ic}$ of the interference channels of the interference base station that are aligned in the same space and the vector obtained by scaling the reception beamforming vector of the terminal device served by the interference base station.

When a null space of the generated matrix $M_i$ exists, a multiplication $M_i x_i$ of the generated matrices may become zero. In this example, the reception beamforming vector generator 1002 may calculate $x_i$ enabling the multiplication $M_i x_i$ of the generated matrices to become zero using Equation 19 below. The reception beamforming vector generator 1002 may generate the reception beamforming vector of each of the terminal devices served by the serving base station by normalizing $x_i$.

$$M_i = \begin{bmatrix} I_M & -H_i^{[1,\bar{i}]} & 0 \\ I_M & 0 & -H_i^{[2,\bar{i}]} \end{bmatrix}, \quad \text{[Equation 19]}$$

-continued $$x_i = \begin{bmatrix} h_i^{ic} \\ \dfrac{1}{\alpha_1^{[i]}} w^{[1,\bar{i}]} \\ \dfrac{1}{\alpha_2^{[i]}} w^{[2,\bar{i}]} \end{bmatrix},$$

$$\begin{bmatrix} I_M & -H_i^{[1,\bar{i}]} & 0 \\ I_M & 0 & -H_i^{[2,\bar{i}]} \end{bmatrix} \begin{bmatrix} h_i^{ic} \\ \dfrac{1}{\alpha_1^{[i]}} w^{[1,\bar{i}]} \\ \dfrac{1}{\alpha_2^{[i]}} w^{[2,\bar{i}]} \end{bmatrix} = M_i x_i = 0$$

In Equation 19, $I_M$ corresponds to the identity matrix, $H_i^{[1,\bar{i}]}$ corresponds to a channel of the third terminal device, and $H_i^{[1,\bar{i}]}$ corresponds to a channel of the fourth terminal device. According to Equation 19, the reception beamforming vector generator 1002 may generate the reception beamforming vector $w^{[1,i]}$ of the first terminal device, for example, the MS1 910 and the reception beamforming vector $w^{[2,i]}$ of the second terminal device, for example, the MS2 920.

In this example, the precoder 1003 may transmit the generated reception beamforming vector to a corresponding terminal device. For example, the precoder 1003 may transmit the reception beamforming vector of the MS1 910 to the MS1 910, and may transmit the reception beamforming vector of the MS2 920 to the MS2 920.

The precoder 1003 may transmit a reception beamforming matrix including the generated reception beamforming vectors to a plurality of terminal devices served by the serving base station. For example, the precoder 1003 may transmit the reception beamforming matrix to the MS1 910 and the MS2 920.

The precoder 1003 may generate a precoding vector $v^{[k,i]}$ of the terminal devices included in the cell edge region of the serving base station i, based on the basis vector $h_i^{ic}$ of the interference channels of the interference base station and the interference channel $(w^{[\bar{k},i]^H} H_i^{[\bar{k},i]},)^H$ of the serving base station. For example, the precoder 1003 may generate the precoding vector of each of the MS1 910 and the MS2 920 included in the cell edge region of the BS1 810 according to the following Equation 20.

$$v^{[k,i]} \subset \mathrm{null}([(w^{[\bar{k},i]^H} H_i^{[\bar{k},i]})^H, h_i^{ic}]^H) \quad \text{[Equation 20]}$$

According to Equation 20, the precoder 1003 may generate a vector that is orthogonal to a span space where the basis vector $h_i^{ic}$ of the interference channels of the BS2 820 and the interference channel $(w^{[\bar{k},i]^H} H_i^{[\bar{k},i]})^H$ of the BS1 810 are aligned.

Figure 14:
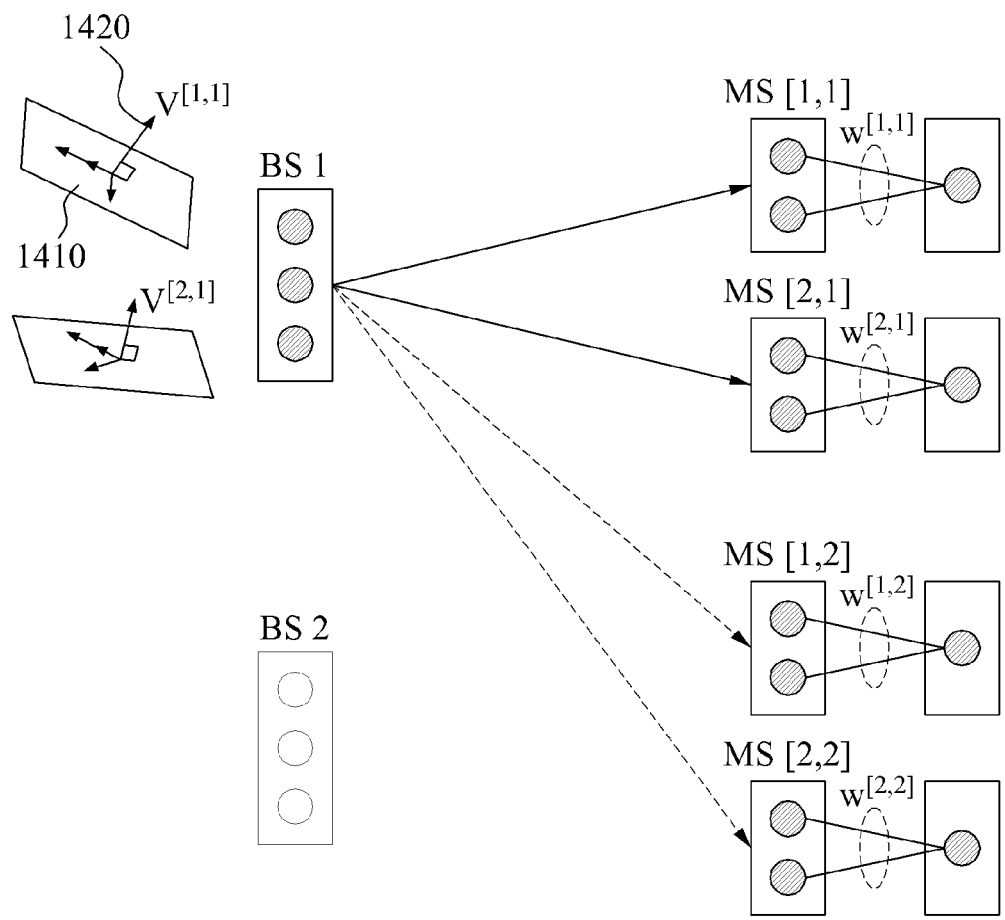
FIG. 14 is a diagram illustrating an example of a process for generating a precoding vector based on aligned effective interference channels.

For example, referring to FIG. 14, when generating a precoding vector of a first terminal device (MS1) included in a cell edge region of a serving base station (BS1), the precoder 1003 may generate a space 1410 including $h_i^{ic}$ and the interference channel $(w^{[2,i]^H} H_i^{[2,i]})^H$ of a second terminal device (BS2), and thereby align $h_i^{ic}$ and $(w^{[2,i]^H} H_i^{[2,i]})^H$ in the generated space. The precoder 1003 may generate, as the precoding vector of the MS1, a vector 1420 that is orthogonal to the generated space 1410. The precoder 1003 may generate a space where a portion of or all of $h_i^{ic}$ and $(w^{[2,i]^H} H_i^{[2,i]})^H$ are overlapped with each other.

The precoder 1003 may transmit data that is precoded using the generated precoding vector, to the plurality of terminal devices included in the cell edge region of the serving base station. The precoder 1003 may contain the generated reception beamforming vector in the precoded data and thereby transmit the precoded data to the plurality of terminal devices included in the cell edge region of the serving base station. The terminal device served by the serving base station may align inter-user interference and inter-cell interference by decoding the precoded data using the reception beamforming vector. The inter-user alignment and the inter-cell interference may be reduced through the above alignment, and thus the terminal device served by the serving base station may extract a desired signal.

Figure 11:
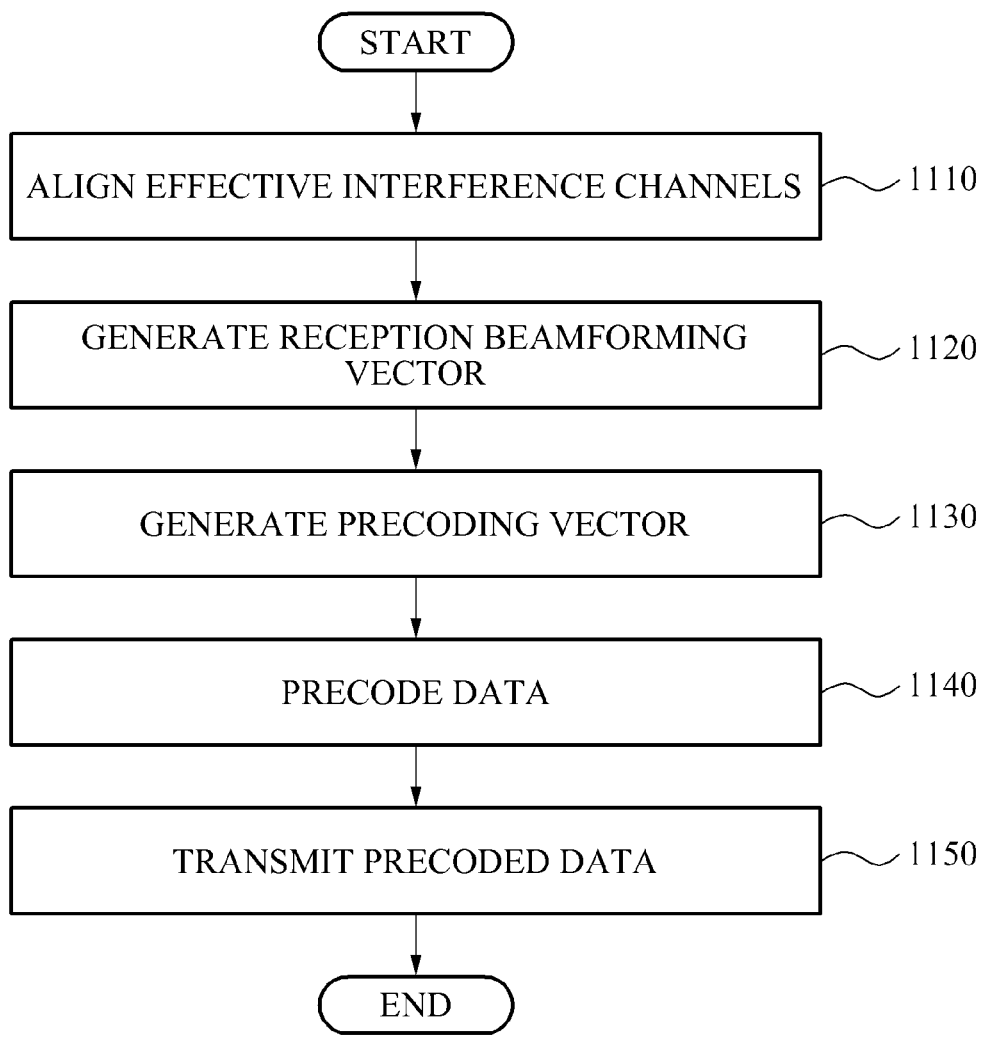
FIG. 11 is a flowchart illustrating an example of a method of a communication apparatus that generates a reception beamforming vector.

FIG. 11 illustrates an example of a method of a communication apparatus that generates a reception beamforming vector.

In 1110, the interference channel alignment unit 1001 may align interference channels of terminal devices included in a cell edge region of an interference base station.

For example, referring to FIG. 8, when the MS3 930 and the MS4 940 are included in the cell edge region of the BS2 820, the interference channel alignment unit 1001 may generate a space where a portion of or all of the interference channels of the MS3 930 and the MS4 940 are overlapped with each other. The interference channel alignment unit 1001 may align the interference channels of the MS3 930 and the MS4 940 in the generated space. In this example, the interference channel alignment unit 1001 may generate a space where a predetermined ratio of the interference channels of the MS3 930 and the MS4 940 are overlapped with each other.

In 1120, the reception beamforming vector generator 1002 may generate a reception beamforming vector of each of the terminal devices included in the cell edge region of the serving base station, based on the interference channels of the interference base station that are aligned in the generated space.

For example, the reception beamforming vector generator 1002 may generate the reception beamforming vector of each of the terminal devices included in the cell edge region of the serving base station by normalizing a matrix including vectors obtained by scaling reception beamforming vectors of terminal devices served by the interference base station. The precoder 1003 may transmit the generated reception beamforming vector to a corresponding terminal device served by the serving base station.

In 1130, the precoder 1003 may generate the precoding vector based on a basis vector of each of the aligned interference channels.

For example, as shown in FIG. 14, the precoder 1003 may generate the space 1410 including the basis vector $h_i^{ic}$ of the aligned interference channels of the interference base station and an interference channel of the terminal device served by the serving base station. The precoder 1003 may generate the precoding vector 1420 to be orthogonal to the generated space 140.

In 1140, the precoder 1003 may precode data using the generated precoding vector.

In 1150, the precoder 1003 may transmit the precoded data to a corresponding terminal device served by the serving base station. In this example, the precoder 1003 may include the to precoded data in the reception beamforming vector of the corresponding terminal device served by the serving base station, and thereby transmit the precoded data.

Figure 12:
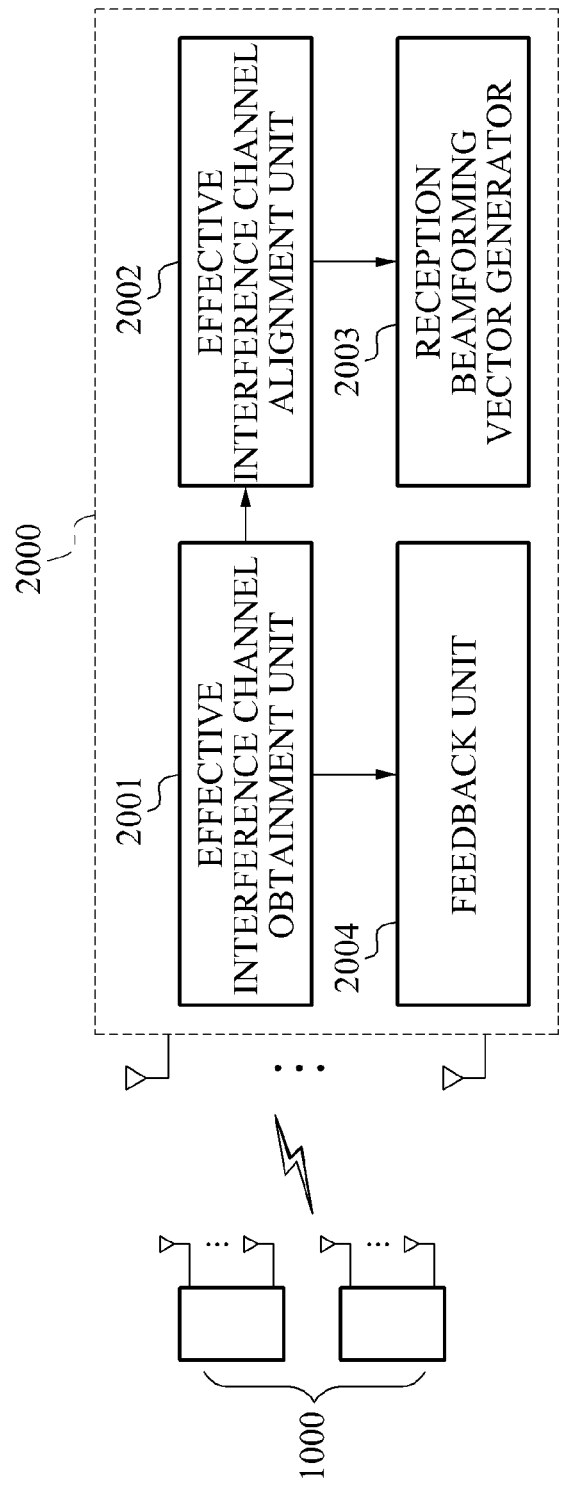
FIG. 12 is a diagram illustrating an example of a terminal device that generates a reception beamforming vector.

FIG. 12 illustrates an example of a terminal device that generates a reception beamforming vector.

Referring to FIG. 12, terminal device 2000 includes an interference channel obtainment unit 2001, an interference channel alignment unit 2002, a reception beamforming vector generator 2003, and a feedback unit 2004.

The interference channel obtainment unit 2001 may obtain interference channels of terminal devices included in a cell edge region of an interference base station.

For example, referring again to FIG. 8, the interference channel obtainment unit 2001 may obtain interference channels of the MS3 930 and the MS4 940 that are served by the BS2 820 that corresponds to an interference base station. The interference channel obtainment unit 2001 may obtain the interference channels of the MS3 930 and the MS4 940 served by the BS2 820 from the BS1 810, the BS2 820, or the terminal devices served by the BS2 820.

The interference channel alignment unit 2002 may align, in the same space, the interference channels of the terminal devices served by the interference base station. For example, the interference channel alignment unit 2002 may generate the space including the interference channels of the MS3 930 and the MS4 940 using Equation 17. The interference channels of the MS3 930 and the MS4 940 may be aligned in the same space.

For example, the interference channel alignment unit 2002 may generate a space where a portion of or all of the interference channels of the terminal devices served by the interference base station are overlapped with each other. For example, the interference channel alignment unit 2002 may generate a space where at least a predetermined ratio of the interference channels of the MS3 930 and the MS4 940 are overlapped with each other, and thereby align the interference channels in the space.

The feedback unit 2004 may feed back the aligned interference channels of the interference base station to the serving base station. In this example, the feedback unit 2004 may include the interference channels of the interference base station in a serving channel of the terminal device 2000 and thereby feed back the same to the serving base station. While feeding back channel information to the serving base station, the feedback unit 2004 may also feed back the aligned interference channels of the interference base station to the serving base station.

In this example, the serving base station may generate a precoding vector based on the fed back interference channels of the interference base station and the interference channel of the terminal device served by the serving base station. For example, the serving base station may generate the precoding vector using Equation 20.

Referring again to FIG. 12, the reception beamforming vector generator 2003 may generate the reception beamforming vector of each of the terminal devices served by the cell edge region of the serving base station, based on the aligned interference channels.

For example, according to Equation 19, the reception beamforming vector generator 2003 may generate the reception beamforming vector of each of the terminal devices included in the cell edge region of the serving base station by normalizing the matrix including vectors obtained by scaling the reception beamforming vectors of the terminal devices of the interference base station. A process of generating the reception beamforming vector using Equation 19 is described above with reference to FIG. 10, and thus further description is omitted here.

Figure 13:
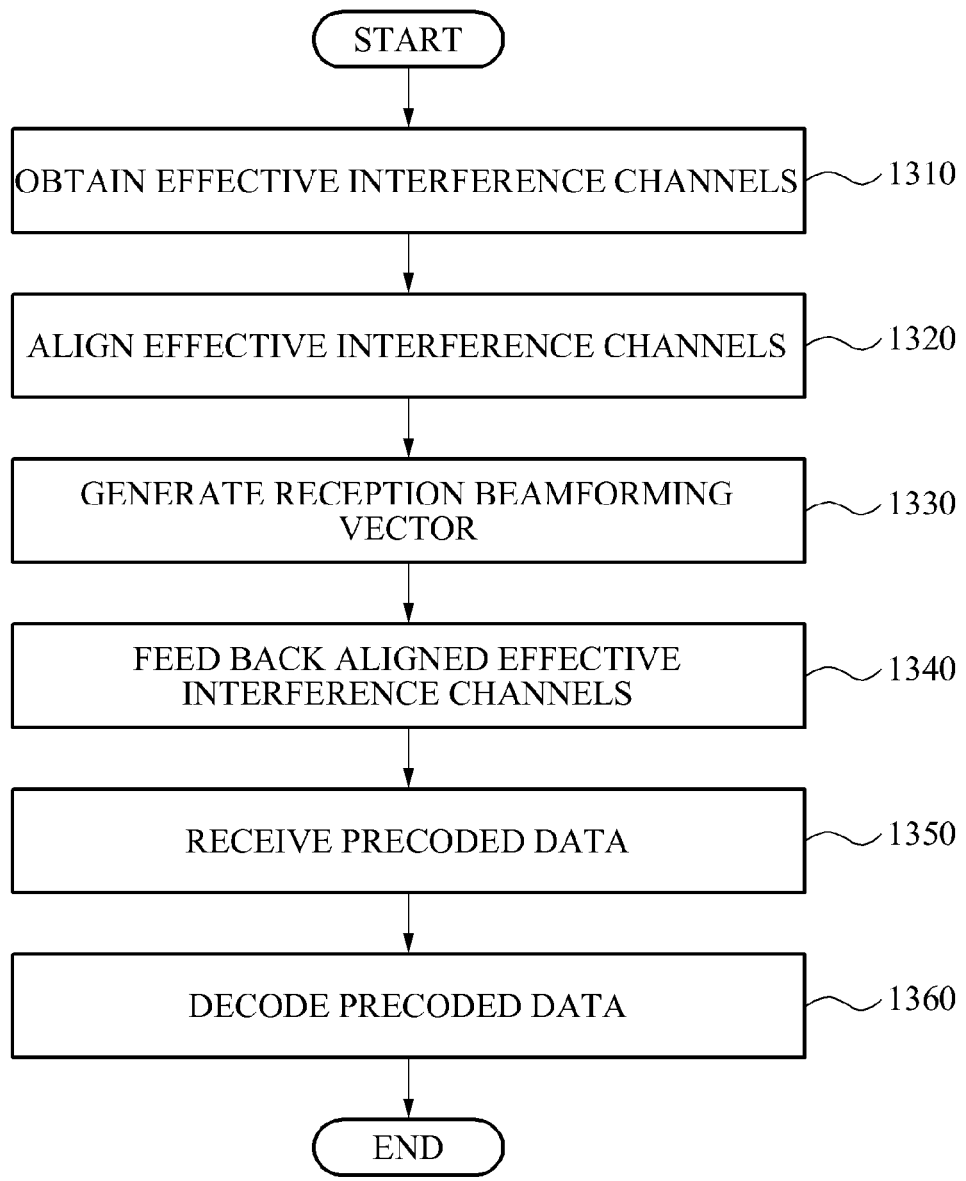
FIG. 13 is a flowchart illustrating an example of a method of a terminal device that generates a reception beamforming vector.

FIG. 13 illustrates an example of a method of a terminal device that generates a reception beamforming vector.

In 1310, the interference channel obtainment unit 2001 may obtain interference channels of terminal devices included in a cell edge region of an interference base station.

In 1320, the interference channel alignment unit 2002 may align the obtained interference channels. For example, the interference channel alignment unit 2002 may generate a space including the interference channels of the terminal devices served by the interference base station, and may align, in the generated space, the interference channels of the terminal devices served by the interference base station. In this example, the interference channel alignment unit 2002 may align, in the generated space, a portion of or all of the interference channels to be overlapped with each other.

In 1330, the reception beamforming vector generator 2003 may generate a reception beamforming vector of each of the terminal devices served by the serving base station based on the aligned interference channels of the terminal devices served by the interference base station. The reception beamforming vector generator 2003 may generate the reception beamforming vector of each of the terminal devices served by the serving base station using Equation 19.

In 1340, the feedback unit 2004 may feed back, to the serving base station, the interference channels of the terminal devices served by the interference base station.

For example, the feedback unit 2004 may feed back, to the serving base station, a basis vector $h_i^{ic}$ of the aligned interference channels. The feedback unit 2004 may contain the basis vector $h_i^{ic}$ in a serving channel of the terminal device 2000 and thereby feed back the same to the serving base station.

While feeding back channel information, the feedback unit 2004 may also feed back the basis vector $h_i^{ic}$.

The serving base station may generate the precoding vector based on the basis vector $h_i^{ic}$ of the aligned interference channels and an interference channel of a terminal device served by the serving base station. For example, referring to FIG. 14, the serving base station may generate the precoding vector 1420 that is orthogonal to the space 1410 including the basis vector $h_i^{ic}$ and the interference channel of the terminal device served by the serving base station, as described above. The serving base station may transmit, to the terminal devices served by the serving base station, data that is precoded using the generated precoding vector.

For example, when precoded data is received by the MS1 910 in 1350, in 1360 the MS1 910 may decode the precoded data using the reception beamforming vector generated in 1330. Interference signals received by the MS1 910 may be aligned in an interference signal space. Accordingly, the MS1 910 may extract a desired signal.

Described herein are a precoding method and a communication apparatus that may remove or align inter-cell interference and intra-cell interference based on a location of each terminal device.

Also, described herein are a precoding method and a communication apparatus that may align, in the same space, interference channels of terminal devices served by an interference base station.

Also, described herein are a precoding method and a communication apparatus that may decrease the number of antennas in a serving base station as interference channels of terminal devices served by an interference base station are aligned in the same space.

Also, described herein are a precoding method and a communication apparatus that may generate a reception beamforming vector of a terminal device corresponding to a cell edge region, and generate a precoding vector using the generated reception beamforming vector.

As a non-exhaustive illustration only, the terminal device described herein may refer to mobile devices such as a cellular phone, a personal digital assistant (PDA), a digital camera, a portable game console, an MP3, player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A precoding method, comprising:
   aligning, in the same space, different interference channels corresponding to different terminal devices included in a cell edge region of an interference base station; and
   generating a reception beamforming vector of one or more terminal devices included in a cell edge region of a serving base station, based on the aligned interference channels of the interference base station,
   wherein the interference channels comprise a first interference channel of a first terminal and a second interference channel of a second terminal, and
   wherein the aligning in the same space comprises calculating a rank of the first interference channel and the second interference channel to have a value of 1 or a proximate value of 1.

2. The precoding method of claim 1, further comprising:
   generating a precoding vector of the one or more terminal devices included in the cell edge region of the serving base station, based on a basis vector of each of the interference channels of the interference base station that are aligned in the same space, and an interference channel of the serving base station.

3. The precoding method of claim 2, further comprising:
   transmitting, to the one or more terminal devices included in the cell edge region of the serving base station, at least one of the reception beamforming vector and data that is precoded using the generated precoding vector.

4. The precoding method of claim 1, wherein the aligning comprises aligning, in the same space, the interference channels of the one or more terminal devices included in the cell edge region of the interference base station to be partially overlapped with each other.

5. The precoding method of claim 1, wherein the aligning in the same space is performed by calculating $\mathrm{rank}(w^{[1,\tilde{j}]^H} H_i^{[1,\tilde{j}]^H}, w^{[2,\tilde{j}]^H} H_i^{[2,\tilde{j}]^H}) \approx 1$.

6. The precoding method of claim 1, wherein the reception beamforming vector is obtained by using the aligned effective interference channels in the same space to discern the direction of the effective interference channels with respect to a basis vector.

7. The precoding method of claim 6, wherein the reception beamforming vector is obtained by calculating $$h_i^{ic} = \frac{1}{\alpha_1^{[i]}} H_i^{[1,\tilde{j}]^H} w^{[1,\tilde{j}]} = \frac{1}{\alpha_2^{[i]}} H_i^{[2,\tilde{j}]^H} w^{[2,\tilde{j}]}$$

where $$\frac{1}{\alpha_1^{[i]}} w^{[1,\tilde{j}]}$$

corresponds to a vector obtained by scaling the reception beamforming vector of a first terminal device served by the interference base station ĩ, and $$\frac{1}{\alpha_2^{[i]}} w^{[2,\tilde{j}]}$$

corresponds to a vector obtained by scaling the reception beamforming vector of the second terminal device.

8. A communication apparatus, comprising:
   an interference channel alignment unit configured to align, in the same space, different interference channels corresponding to different terminal devices included in a cell edge region of an interference base station; and
   a reception beamforming vector generator configured to generate a reception beamforming vector of one or more terminal devices included in a cell edge region of a serving base station, based on the aligned interference channels of the interference base station,
   wherein the interference channels comprise a first interference channel of a first terminal and a second interference channel of a second terminal, and wherein the aligning in the same space comprises calculating a rank of the first interference channel and the second interference channel to have a value of 1 or a proximate value of 1.

9. The communication apparatus of claim 8, further comprising:
a precoder configured to generate a precoding vector of the one or more terminal devices included in the cell edge region of the serving base station, based on a basis vector of each of the interference channels of the interference base station that are aligned in the same space, and an interference channel of the serving base station.

10. The communication apparatus of claim 9, wherein the precoder transmits, to the one or more terminal devices included in the cell edge region of the serving base station, at least one of the reception beamforming vector and data that are precoded using the generated precoding vector.

11. The communication apparatus of claim 8, wherein the interference channel alignment unit aligns, in the same space, the interference channels of the one or more terminal devices included in the cell edge region of the interference base station to be partially overlapped with each other.

12. A method of generating a reception beamforming, comprising:
obtaining different interference channels corresponding to different terminal devices included in a cell edge region of an interference base station;
aligning the obtained interference channels in the same space; and
generating a reception beamforming vector of one or more terminal devices included in a cell edge region of a serving base station, based on the aligned interference channels of the interference base station,
wherein the interference channels comprise a first interference channel of a first terminal and a second interference channel of a second terminal, and
wherein the aligning the obtained interference channels in the same space comprises calculating a rank of the first interference channel and the second interference channel to have a value of 1 or a proximate value of 1.

13. The method of claim 12 further comprising:
feeding back, to the serving base station, at least one of the aligned interference channels and a serving channel.

14. The method of claim 12, wherein the aligning comprises aligning, in the same space, the interference channels of the one or more terminal devices included in the cell edge region of the interference base station to be partially overlapped with each other.

15. A terminal device, comprising:
an interference channel obtainment unit configured to obtain different interference channels corresponding to different terminal devices included in a cell edge region of an interference base station;
an interference channel alignment unit configured to align the obtained interference channels in the same space; and
a reception beamforming vector generator configured to generate a reception beamforming vector of one or more terminal devices included in a cell edge region of a serving base station, based on the aligned interference channels of the interference base station,
wherein the interference channels comprise a first interference channel of a first terminal and a second interference channel of a second terminal, and
wherein the aligning the obtained interference channels in the same space comprises calculating a rank of the first interference channel and the second interference channel to have a value of 1 or a proximate value of 1.

16. The terminal device of claim 15, further comprising:
a feedback unit configured to feed back, to the serving base station, at least one of the aligned interference channels and a serving channel.

17. The terminal device of claim 15, wherein the interference channel alignment unit aligns, in the same space, the interference channels of the one or more terminal devices included in the cell edge region of the interference base station to be partially overlapped with each other.

* * * * *